(12) United States Patent
Pendl

(10) Patent No.: US 8,262,102 B2
(45) Date of Patent: Sep. 11, 2012

(54) CARGO CART WITH ATTACHABLE SKIS AND METHOD OF USE THEREOF

(76) Inventor: Robert J. Pendl, Gloversville, NY (US)

( * ) Notice: Subject to any disclaimer, the term of this patent is extended or adjusted under 35 U.S.C. 154(b) by 0 days.

(21) Appl. No.: 13/030,475

(22) Filed: Feb. 18, 2011

(65) Prior Publication Data

US 2012/0013083 A1    Jan. 19, 2012

Related U.S. Application Data

(63) Continuation-in-part of application No. 12/836,616, filed on Jul. 15, 2010.

(51) Int. Cl.
*B62B 13/18* (2006.01)

(52) U.S. Cl. .......................................................... 280/9

(58) Field of Classification Search ................ 280/9–11, 280/7.12–7.14, 655–656, 638–639, 34, 42; D12/6

See application file for complete search history.

(56) References Cited

U.S. PATENT DOCUMENTS

| | | | |
|---|---|---|---|
| 1,005,379 A | 10/1911 | Walters | |
| 1,409,501 A | 3/1922 | Volz | |
| 1,695,710 A | 12/1928 | Georgius | |
| 2,950,924 A | 8/1960 | Gantz | |
| 3,011,576 A | 12/1961 | Howes | |
| 3,442,268 A | 5/1969 | Symes | |
| 3,623,563 A | 11/1971 | Gostomski | |
| 3,653,677 A | 4/1972 | Feser | |
| 3,784,230 A | 1/1974 | Worrall, Jr. | |
| 3,901,525 A * | 8/1975 | O'Brien et al. | 280/14 |
| 4,337,957 A | 7/1982 | Heine | |
| 4,417,765 A | 11/1983 | Wirsbinski | |
| 4,738,457 A | 4/1988 | Conrad | |
| 4,819,956 A * | 4/1989 | Campbell | 280/203 |
| 6,113,116 A | 9/2000 | Stanton et al. | |
| 6,331,008 B2 | 12/2001 | Cormican | |
| 6,536,846 B1 | 3/2003 | Felty | |
| 6,932,359 B2 | 8/2005 | Ouellette | |
| 6,945,743 B2 * | 9/2005 | Sherman et al. | 414/476 |
| 7,543,842 B1 | 6/2009 | Fiorini | |

FOREIGN PATENT DOCUMENTS

CA    2691122 A1 *  5/2010

OTHER PUBLICATIONS

U.S. Appl. No. 12/836,616, filed Jul. 15, 2010; Confirmation No. 2576; Customer No. 5409.

* cited by examiner

*Primary Examiner* — John Walters
*Assistant Examiner* — James Triggs
(74) *Attorney, Agent, or Firm* — Schmeiser, Olsen & Watts, LLP

(57) ABSTRACT

Disclosed herein is a cargo cart that includes a bed configured for carrying cargo, the bed an upper surface and an under surface. The cart includes an axle located beneath the under surface of the bed, the axle having a first end and second end, and a first leg removably attached to the first end of the axle such that the first leg is prevented from substantial rotation about the axle, the first leg extending below the axle to a first connection location. A first ski is removably connected to the first leg at the first connection location. A second leg is removably attached to the second end of the axle such that the first leg is prevented from substantial rotation about the axle, the second leg extending below the axle to second connection location and a second ski removably connected to the second leg at the second connection location.

19 Claims, 20 Drawing Sheets

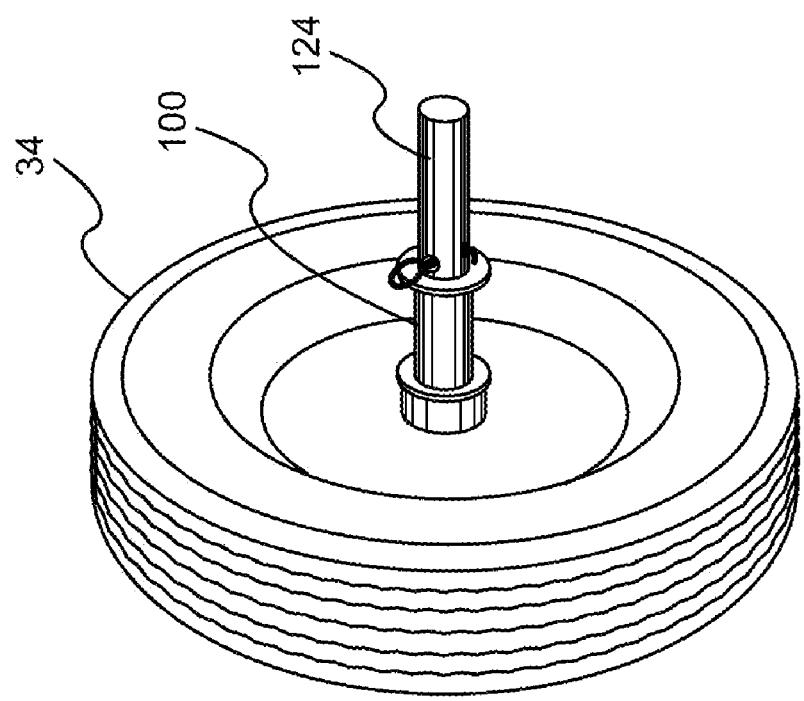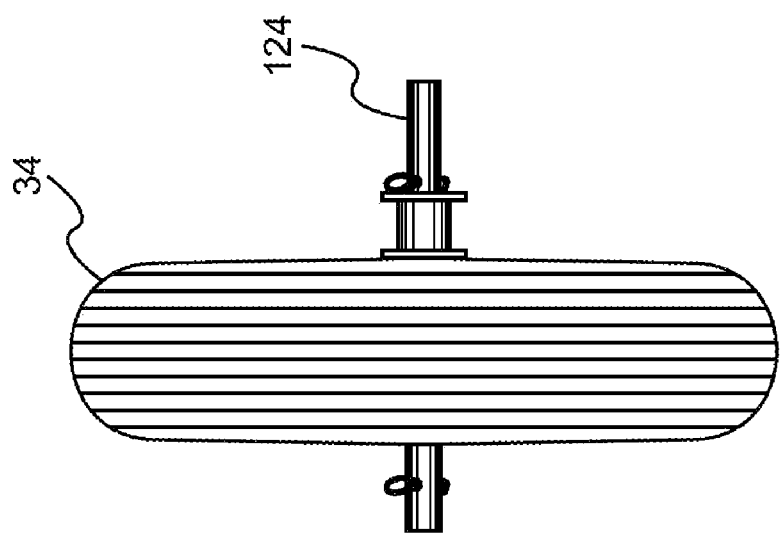
Fig. 10

# CARGO CART WITH ATTACHABLE SKIS AND METHOD OF USE THEREOF

RELATED APPLICATION

This application is a continuation-in-part of and claims priority from co-pending U.S. patent application Ser. No. 12/836,616 filed May 15, 2010 and entitled "Cargo Cart with Attachable Skis and Method of Use Thereof," which is incorporated herein by reference in its entirety.

FIELD OF THE DISCLOSURE

The subject matter disclosed herein relates generally to cargo carts. More particularly, the subject matter relates to a cargo cart that is adaptable between a wheeled embodiment and a sled embodiment and method of use thereof.

BACKGROUND OF THE DISCLOSURE

Cargo carts or vehicles, such as garden carts, dump carts, or the like, are utilized by people for transporting cargo in various situations. A typical cargo cart includes a bed for retaining the cargo for transport, and wheels for mobility. Carts may be utilized for any type of cargo, such as chopped wood, bricks, stone, dirt, plants, mulch and the like. Cargo carts may have various shapes, sizes, load capacities. Some may be attachable to a vehicle, while others may require hand pushing or pulling. However, the mobility of a cargo cart may be reduced in the winter time when there is snow, slush or ice on top of the surface that the cargo cart must travel. In this situation, a cargo cart having a low riding bed may build up snow under the cart. Furthermore, the wheels may get stuck in the snow or reduce the stability of the cargo cart.

Thus, a cargo cart that is adaptable between a wheeled embodiment and a sled embodiment and method of use thereof would be well received in the art.

BRIEF DESCRIPTION OF THE DISCLOSURE

According to one aspect of the invention, a cargo cart comprises: a bed configured for carrying cargo, the bed an upper surface and an under surface; an axle located beneath the under surface of the bed, the axle having a first end and second end; a first leg removably attached to the first end of the axle such that the first leg is prevented from substantial rotation about the axle, the first leg extending below the axle to a first connection location; a first ski removably connected to the first leg at the first connection location; a second leg removably attached to the second end of the axle such that the first leg is prevented from substantial rotation about the axle, the second leg extending below the axle to second connection location; and a second ski removably connected to the second leg at the second connection location.

According to another aspect of the invention, a kit for a cargo cart comprises: a first leg having a first opening, the first opening configured to receive a first end of an axle of the cargo cart such that the first leg is configured to extend below the axle to a first connection location; a first ski removably connectable to the first leg at the first connection location; a second leg having a second opening, the second opening configured to receive a second end of the axle of the cargo cart such that the second leg is configured to extend below the axle to a second connection location; a second ski removably connectable to the second leg at the second connection location; and a means for preventing substantial rotation of the first and second legs about the axle when the first and second legs are attached to the axle.

According to yet another aspect of the invention, a cargo cart comprises: a bed configured for carrying cargo, the bed including a left side, a right side, a front side and a back side, the bed further including an upper surface and an under surface; a first handle beam extending along the left side of the cargo cart; a second handle beam extending along the right side of the cargo cart, wherein the first and second handle beams converge at the front side of the bed; a leg having a top end removably attached between the first and second handle beams at the front side of the bed, the first leg extending below the first and second handle beams to a first connection location at a bottom end; and a ski removably connected to the first leg at the first connection location.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 10 depicts an unattached wheel in a storage configuration in accordance with one embodiment;

DETAILED DESCRIPTION OF THE DISCLOSURE

A detailed description of the hereinafter described embodiments of the disclosed apparatus and method are presented herein by way of exemplification and not limitation with reference to the Figures.

Figure 1:
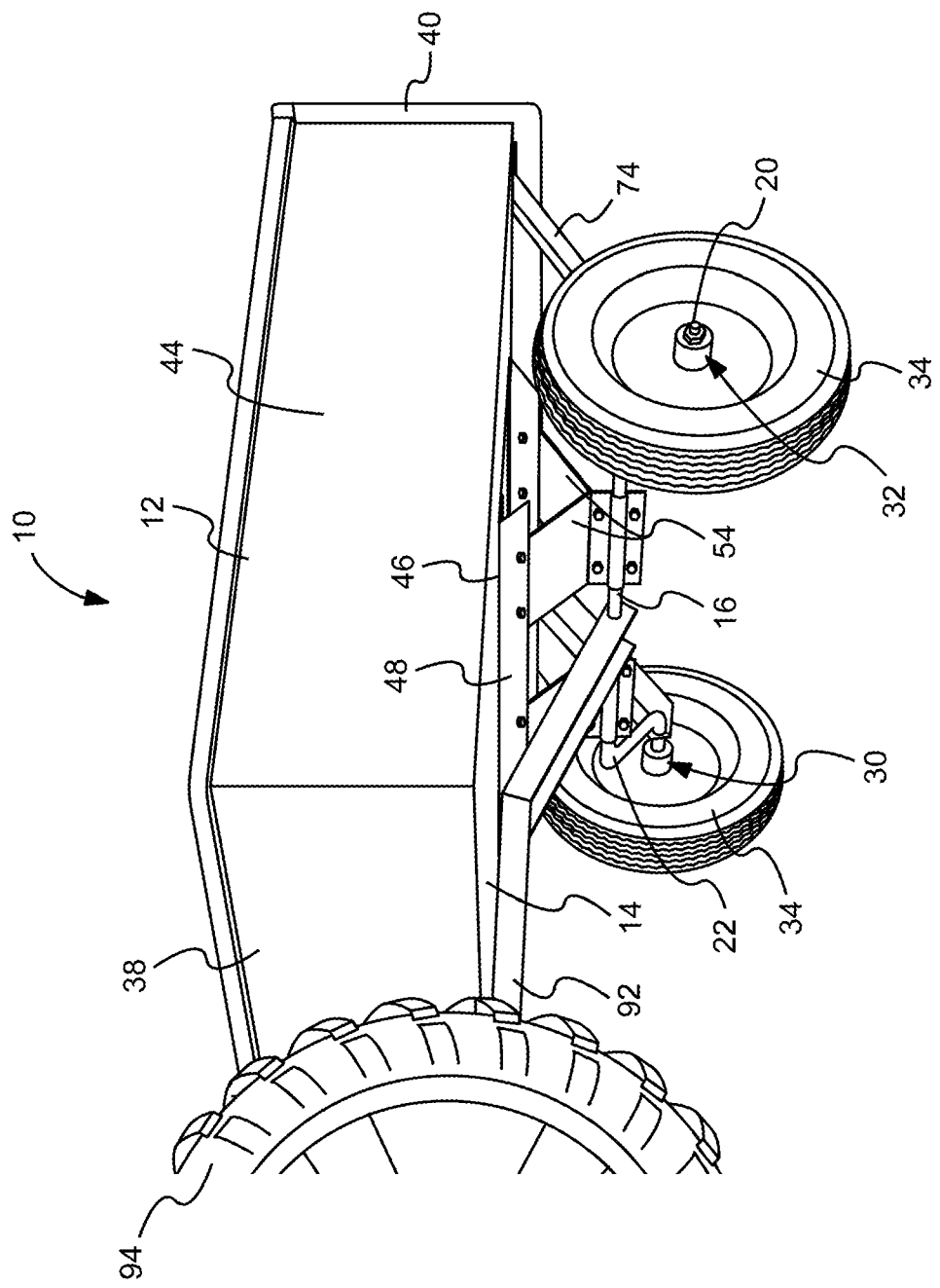
FIG. 1 depicts a perspective view of a cargo cart having an axle with attached wheels in accordance with one embodiment.
Figure 2:
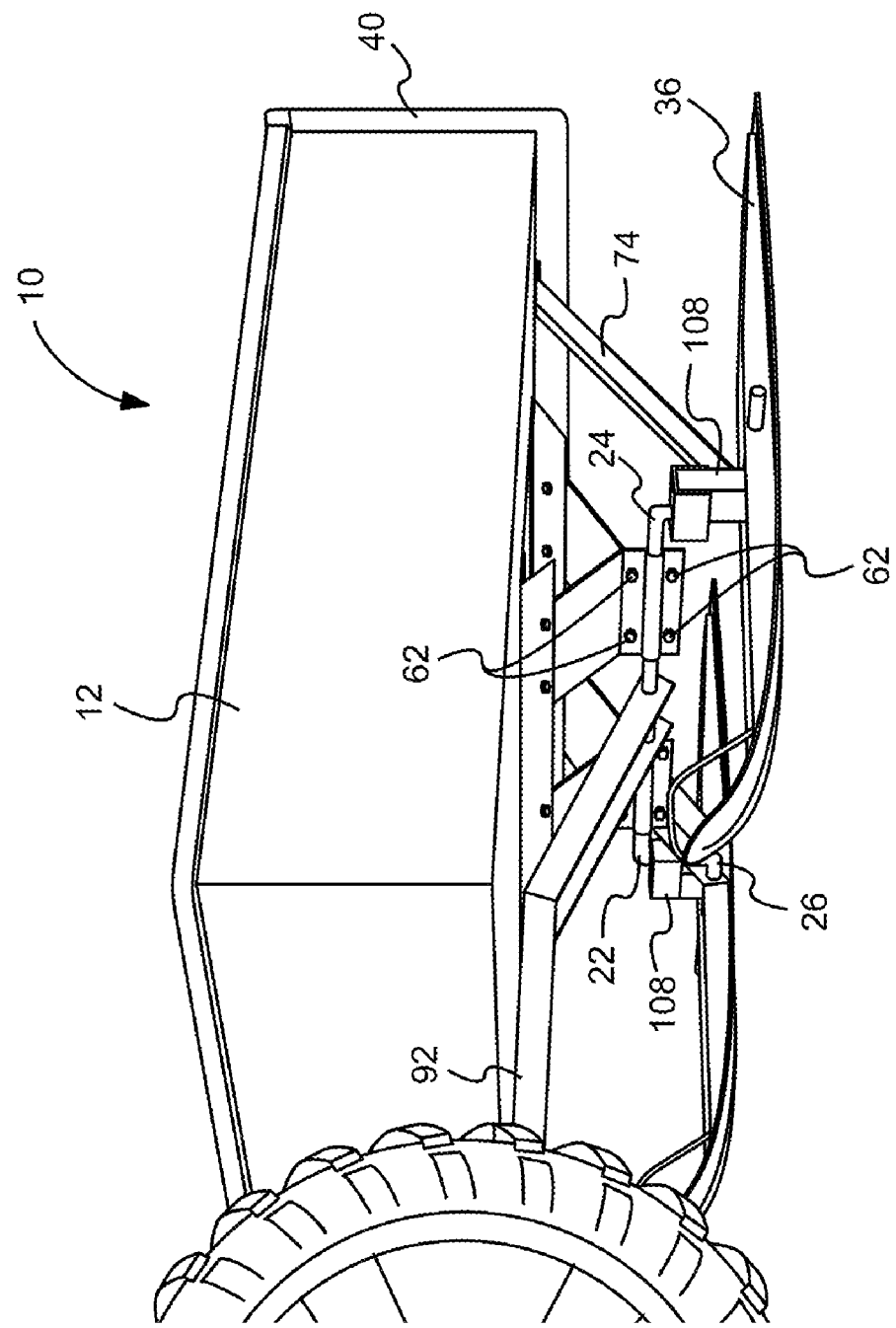
FIG. 2 depicts a perspective view of the cargo cart of FIG. 1 having the axle with attached skis in accordance with one embodiment.

Referring first to FIGS. 1-2, a cargo cart 10 having a bed 12 configured for carrying cargo is shown. The cargo cart 10 is adaptable between a wheeled embodiment, shown in FIG. 1, and a sled embodiment, shown in FIG. 2. Attached to an under surface 14 of the bed 12 is an axle 16. The axle 16 extends between a left end 18 and a right end 20. In the embodiment shown, the axle 16 includes four 90° bends 22, 24, 26, 28. A first bend 22 is proximate the left end 18 while a second bend 24 is proximate the right end 20. The axle 16 extends from each of the first bend 22 and the second bend 24 away from the under surface 14 of the bed 12. The axle 16 also includes a third bend 26 that is located between the first bend 22 and the left end 18, and a fourth bend 28 that is located between the second bend 24 and the right end 20. To accommodate both the sled and the wheeled embodiments, the axle 16 includes a first attachment location 30 located at the left end 18 and a second attachment location 32 located at the right end 20 that are each configured to removably attach both a wheel 34 and a ski 36, one at a time. The axle 16 is configured to rotate between two positions in order to retain the bed 12 at similar levels between the two embodiments. In the sled embodiment, the axle 16 extends perpendicularly from the first and second bends 22, 24 away from the under surface 14 (shown more particularly in FIG. 5). Alternately, in the wheeled embodiment the axle 16 extends at a 45° angle from the first and second bends 22, 24 away from the under surface 14 (shown more particularly in FIG. 3). Thus, the axle 16 is configured to prop the bed 12 up in the ski embodiment in order to compensate for the reduced height resulting from the removal of the wheels 34 and the attachment of the skis 36.

The bed 12 of the cargo cart 10 includes a front side 38, a back side 40, a left side 42 and a right side 44. Furthermore, the bed 12 has an upper surface 46 for carrying cargo opposed to the under surface 14. It should be understood that the bed 12 may be any appropriate cargo carrying structure. While the bed 12 includes a flat carrying surface, this embodiment is not limiting. In other embodiments contemplated, the bed 12 may have various sizes and dimensions. The bed 12 may be made of metal such as sheet metal, cast iron, aluminum, steel, stainless steel. Additionally, plastics, composites or any other appropriate material is also contemplated. The bed 12 may be configured to carry chopped wood, bricks, stone, dirt, plants, sand, mulch, or any other appropriate material. Depending on the intended cargo to be carried, the bed 12 may have various load capacities.

Attached to the under surface 14 of the bed 12 is a bracket 46. The bracket 46 is configured to secure the axle 16 to the under surface 14 of the bed 12 such that the axle 16 is rotatable. The bracket 46 may comprise a base portion 48 that is attached to the under surface 14 of the bed 12, extending across the bed 12 from the left side 42 to the right side 44. The base portion 48 may be attached to the under surface 14 of the bed 12 by a bolt, welding, or any other attachment means. In one embodiment, the base portion 48 may be integrally included in the manufacturing of the under surface 14 of the bed 12. The base portion 48 of the bracket 46 is bent along the edges that run from the left side 42 to the right side 44. The base portion 48 includes a first acutely angled bend 50 and a second acutely angled bend 52.

The bracket 46 may further include two pairs of axle securing plates 54, 56, each axle securing plate being attached to the acutely angled bends 50, 52 and extending from the acutely angled bends 50, 52 at the same, or substantially similar, acute angles from the under surface 14. The axle securing plates 54, 56 may be attached to the first and second acutely angled bends 52 of the base portion 48 by bolts 58. However, welding or any other appropriate attachment means are contemplated. The individual plates of each of the pairs 54, 56 meet at a point that is above where the axle 16 is attached. Each of the plates from the two pairs 54, 56 include an obtusely angled bend 57 such that each of the plates 54, 56 extend perpendicularly from their respective bends 57 under the surface 14 of the bed 12. The perpendicularly extending portion of the plates 54, 56 each include a half-circle shaped channel 60 wrapping around the axle 16. Thus, the combination of each pair 54, 56 and their respective channels 60 surrounding the axle 16. Four bolts 62 are shown connecting the two plates from each pair of plates 54, 56. It should be understood that the bolts 62 may also be any other attachment means. Two bolts 62 are shown above the channel 60 and the axle 16 and two bolts 62 are shown below the channel and the axle 16 to connect each of the pairs of plates 54, 56 and secure the axle 16 in the proper position. The bolts 62 may be tightened to secure the axle 16 between each the pairs of axle securing plates 54, 56.

In the embodiment depicted, the axle 16 may be attached and secured to the bracket 46 during the installation of the pairs of plates 54, 56 with the bolts 62. However, the securing mechanism is not limited to a bracket, such as the bracket 46 depicted in the embodiment shown. Rather, any other securing mechanism is contemplated such that the axle 16 is securably rotatable between the first wheeled position and the second sled position, as described herein. For example, the particular angles 52, 57 may be different than the embodiment shown and described. The axle 16 may not be secured by the bracket 46 substantially below the under surface 14 of the bed 12. Instead, the axle 16 may be directly attached to the under surface 14 with a simple bracket such that the axle 16 directly abuts the under surface 14.

The axle 16 shown in the Figures includes the four 90° bends 22, 24, 26, 28. Correspondingly, the axle 16 includes five sections 64, 66, 68, 70, 72. A first section 64 of the axle 16 is located between the first bend 22 and the second bend 24. A second section 66 of the axle 16 is located between the third bend 26 and the left end 18. A third section 68 of the axle is located between the fourth bend 28 and the right end 20. A fourth section 70 of the axle 16 is located between the first bend 22 and the third bend 26. Finally, a fifth section 72 of the axle 16 is located between the second bend 24 and the fourth bend 28. The first section 64 may be parallel with the second and third sections 66, 68, as shown in the Figures. These sections 64, 66, 68 may also be parallel with the under surface 14 of the bed 12.

Although the bends 22, 24, 26, 28 are shown as 90° bends, other embodiments are contemplated. For example, the bends 22, 24, 26, 28 may be more or less than 90°. In one embodiment, the first and second bends 22, 24 may be obtuse bends (not shown) having an angle greater than 90°. To compensate, the third and fourth bends 26, 28 may also have a greater angle than 90°. Thus, the first section 64 may still be parallel with the second and third sections 66, 68 in this embodiment. Furthermore, the bends 22, 24, 26, 28 may have more or less curvature. For example, the bends 22, 24, 26, 28 may have less curvature and the sections 64, 66, 68, 70 72 may be less pronounced. Alternately, the axle 16 may not have "bends," but rather have firm corners. Any embodiment where the axle 16 is rotatable such that the axle 16 is configured to prop the bed 12 up in the ski embodiment in order to compensate for the reduced height resulting from the removal of the wheels 34 and the attachment of the skis 36 is contemplated.

The cargo cart 10 further includes a first shaft 74 and a second shaft 76 to support the axle 16, and retain the axle 16 in the wheeled position and the sled position. The first and second shafts 74, 76 may be angle irons, having a perpendicularly angled bend along the length as shown in the Figures. The first and second shafts 74, 76 may include an axle attachment end 78 having an opening, hole or bore 80 such that it may be slid onto the first and second ends 18, 20 of the axle 16, respectively. The first and second shafts 74, 76 may extend from the axle 16 to the under surface attachment end 82 at the back side 40 of the under surface 14 of the bed 12. Attachment mechanism 86 such as bolts, screws or the like may be used to attach the shafts 74, 76 to a corresponding attachment location 88, 90 of the under surface 14 of the bed 12. The attachment opening, hole or bore of the first and second shafts 74, 76 may be an opening through which the attachment mechanism 86 attaches the first shaft 74 or the second shaft 76 to the corresponding attachment location 88, 90 of the under surface 14 of the bed 12.

Figure 3:
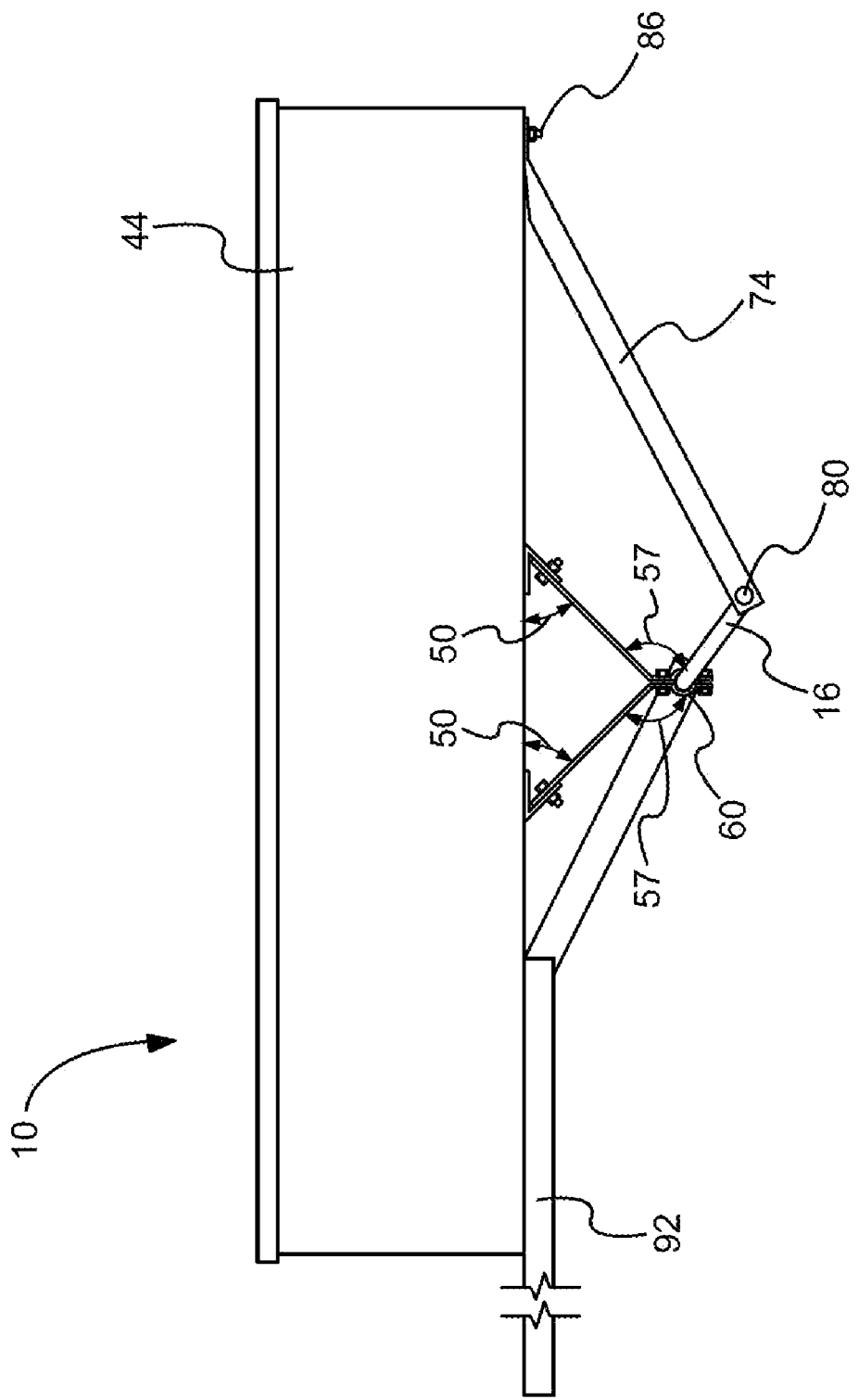
FIG. 3 depicts a side view of the cargo cart of FIGS. 1 and 2 where the axle is in the wheel attachment position, without the wheels being attached in accordance with one embodiment.
Figure 4:
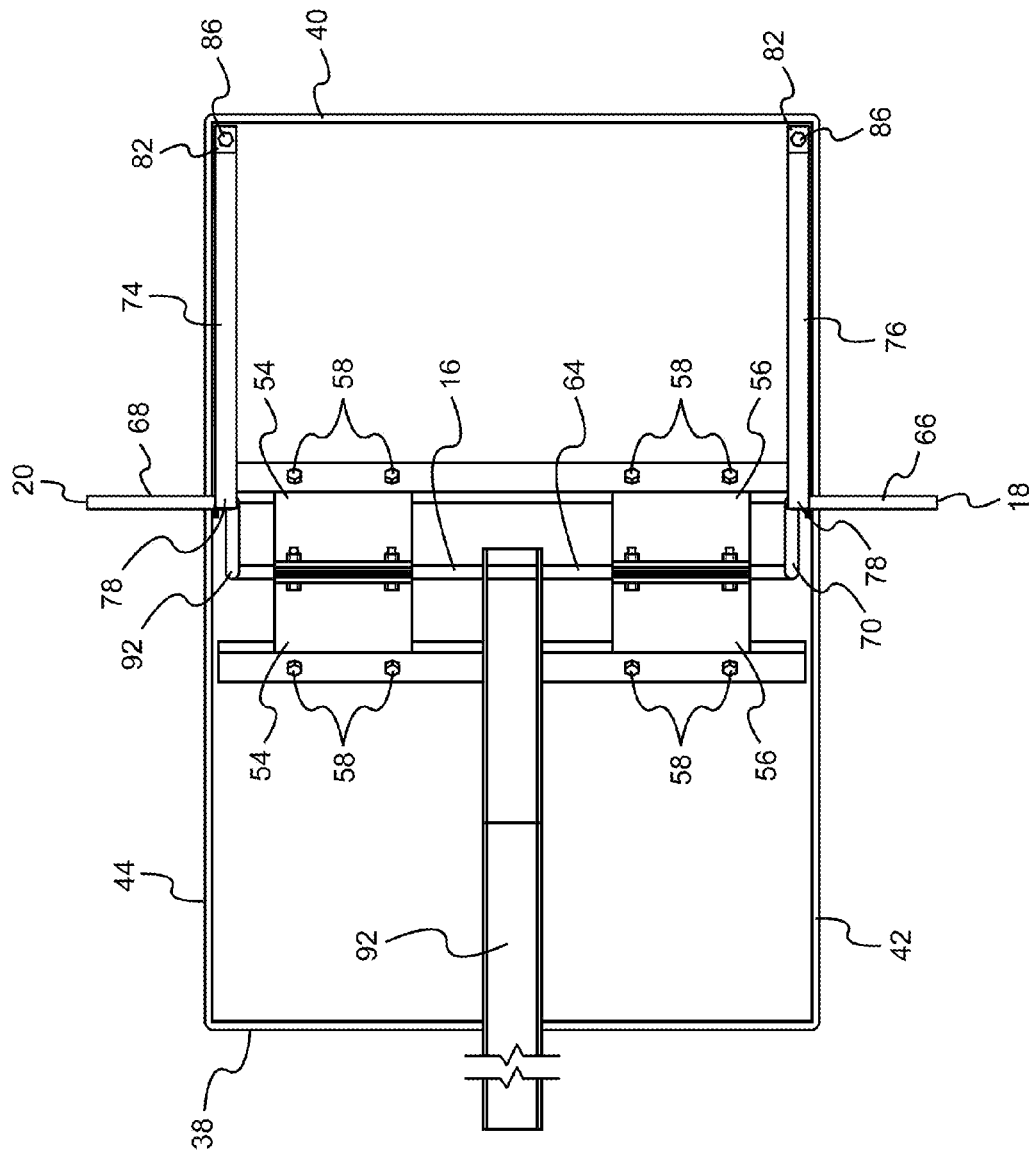
FIG. 4 depicts a bottom view of the cargo cart of FIGS. 1-3 where the axle is in the wheel attachment position, without the wheels being attached in accordance with one embodiment.

FIGS. 3 and 4 depict a side view and a bottom view, respectively, of the cargo cart 10 of FIGS. 1 and 2 where the axle 16 is in the wheel attachment position. In the wheel attachment position, the fourth and fifth sections 70, 72 extend at a 45° angle with respect to the under surface 14 of the bed 12. The fourth and fifth sections 70, 72 extend toward the back side 40 of the under surface 14. The first and second shafts 74, 76 each extend from the axle 16 to a first attachment location 88 of the under surface 14 of the bed 12. The first attachment location 88 is located in close proximity to the back side 40 of the bed 12. The first and second shafts 74, 76 may each be removably secured to their respective first attachment locations 88 by the attachment mechanism 86, such as a bolt, screw, or other appropriate securing mechanism or fastener.

Figure 5:
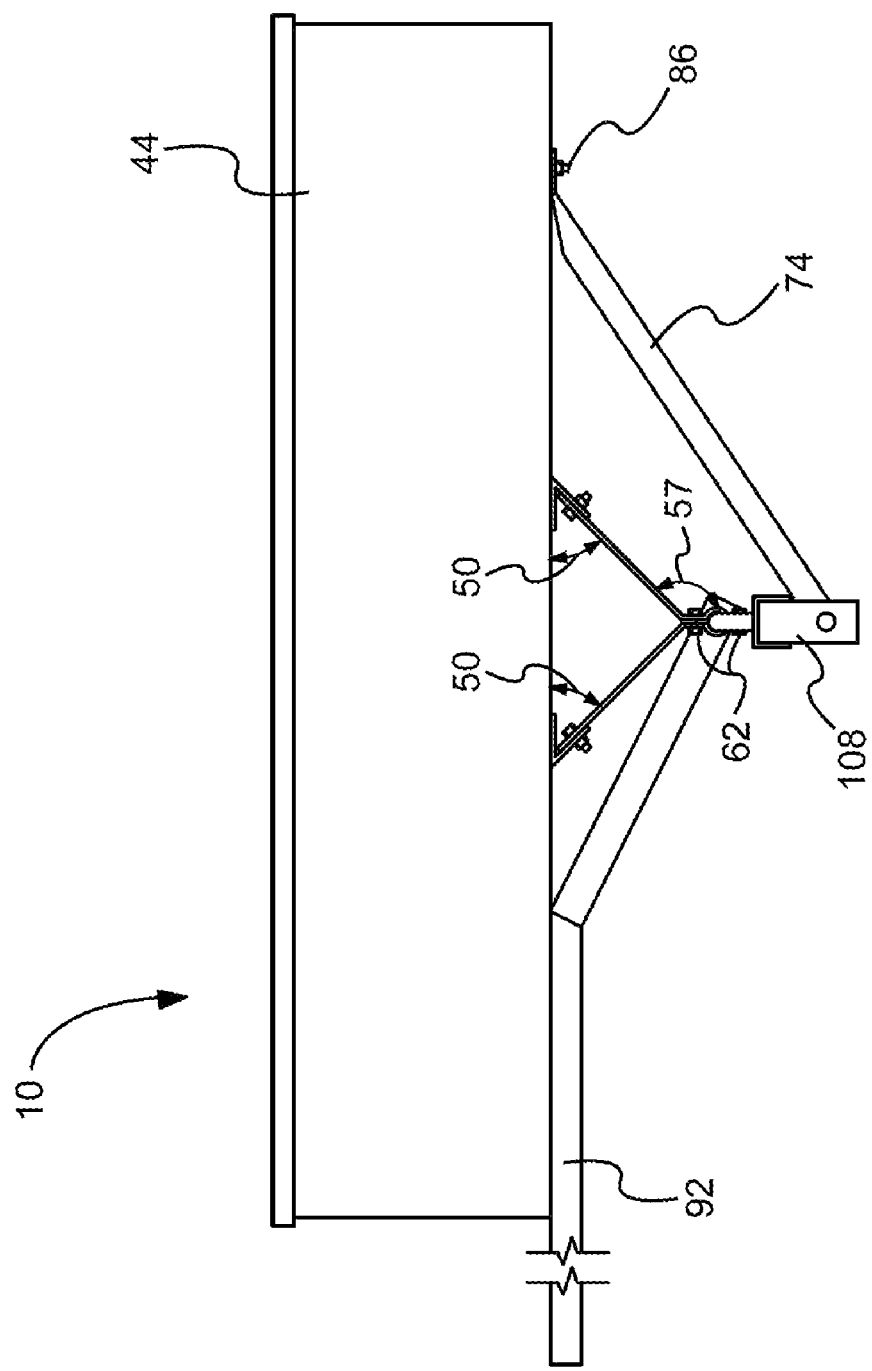
FIG. 5 depicts a side view of the cargo cart of FIGS. 1-4 where the axle is in the ski attachment position, without the skis being attached in accordance with one embodiment.
Figure 6:
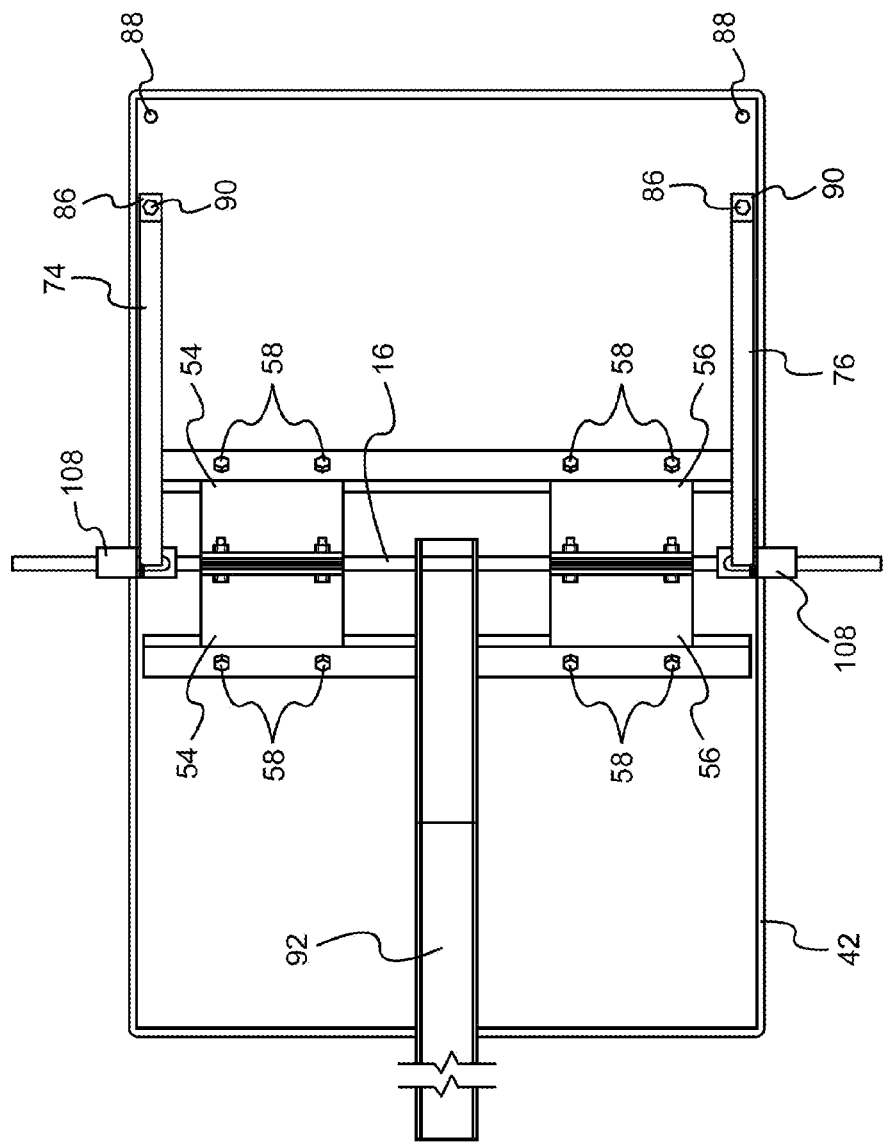
FIG. 6 depicts a side view of the cargo cart of FIGS. 1-5 where the axle is in the ski attachment position, without the skis being attached in accordance with one embodiment.

FIGS. 5 and 6 depict a side view and a bottom view, respectively, of the cargo cart 10 of FIGS. 1 and 2 where the axle 16 is in the ski attachment position. In the ski attachment position, the fourth and fifth sections 70, 72 extend at a 90° angle with respect to the under surface 14 of the bed 12. The first and second shafts 74, 76 each extend from the axle 16 to a second attachment location 90 of the under surface 14 of the bed 12. The second attachment location 90 is located farther from the back side 40 of the bed 12 than the first attachment location 88. The first and second shafts 74, 76 may each be removably secured to their respective second attachment locations 90 by the attachment mechanism 86.

Thus, a person may easily convert the cargo cart 10 from the wheel attachment position, shown in FIGS. 3 and 4, to the ski attachment position, shown in FIGS. 5 and 6. To do so a person would simply unattach, loosen, or remove the attachment mechanism 86 from the first attachment location 88, thereby separating the shafts 74, 76 from the under surface 14 of the bed 12. The person may then rotate the axle 16 freely into the appropriate position so that the attachment openings (not shown) of the shafts 74, 76 line up with the second attachment location 90. The person may then reattach the attachment mechanisms 86 to secure the shafts 74, 76 and retain the axle 16 in the appropriate position.

It should be understood that the amount of rotation, and degree with which the fourth and fifth sections 70, 72 extend with respect to the under surface 14 of the bed 12 is not limited to the 90° and 45° angles described hereinabove. For example, in the wheeled embodiment, the fourth and fifth sections 70, 72 of the axle 16 may extend substantially parallel with the under surface 14 of the bed 12. Any appropriate angle difference is contemplated, so long as the axle 16 is configured to prop the bed 12 up in the ski embodiment compared with the wheel embodiment. Furthermore, it may be particularly advantageous to have an angle greater than 180° between the shafts 74, 76 and the fourth and fifth sections 70, 72, to reduce unwanted rotation of the axle 16 once the shafts 74, 76 are secured.

Referring back to FIGS. 1-2, the cargo cart 10 may include a tongue 92 configured to attach the cargo cart 10 to a vehicle 94. The tongue 92 may be attached directly to the axle 16 and extend from the axle 16 to the front side 38 of the bed 12. The tongue 92 may extend beyond the front side 38 of the bed 12 to attach to the vehicle 94 so that the bed may be towed. The tongue 92 may include one or more attachment mechanisms 96, such as bolts, screws, fasteners or the like to securely attach the tongue 92 to the under surface 14 of the bed 12. The tongue 92 may include a bend 98 such that the tongue 92 extends along the under surface 14 of the bed 12. It should be understood that the tongue 92 may be attachable to trailer hitches from any vehicles such as an ATV or four-wheeler, a snowmobile, a truck, or the like.

Figure 7:
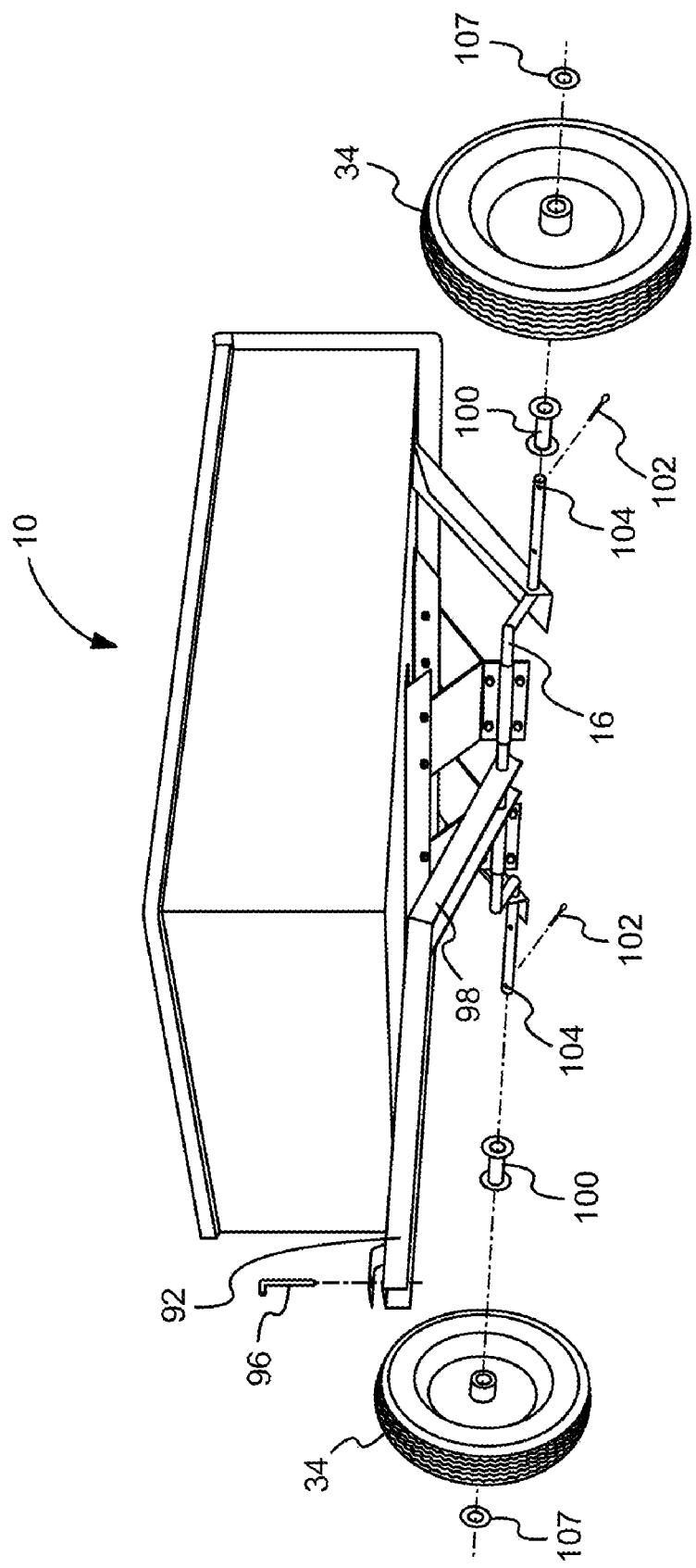
FIG. 7 depicts an exploded view of the cargo cart of FIGS. 1-6 in the wheeled embodiment.

Referring now to FIG. 7, an exploded view of the cargo cart 10 is shown in the wheeled embodiment. Particularly, FIG. 7 shows how the wheels 34 attach to the axle 16. To attach and secure the wheels 34, the openings 80 of the shafts 74, 76 are first inserted into the ends 18, 20 of the axle 16. Next, a bushing 100 is inserted over each of the ends 18, of the axle 16. The bushings 100 may be configured to space the wheels 34 away from the third and fourth bends 26, 28. Furthermore, the bushings 100 may be required because the width of the wheels 34 may be shorter than the width of the skis 36. The bushings 100 may be hollow cylinders configured to space the wheels 34 in a correct position and prevent the wheels 34 from loosely wavering along the axle 16 during use. Once the bushings 100 have been inserted over each of the ends 18, 20 of the axle 16, the wheels 34 may be inserted. Finally, a pin 102 may be inserted into a hole 104 in the axle 16 to secure the wheels 34. The hub of the wheel 34 may thus be secured between the bushings 100 and the pin 102.

Figure 8:
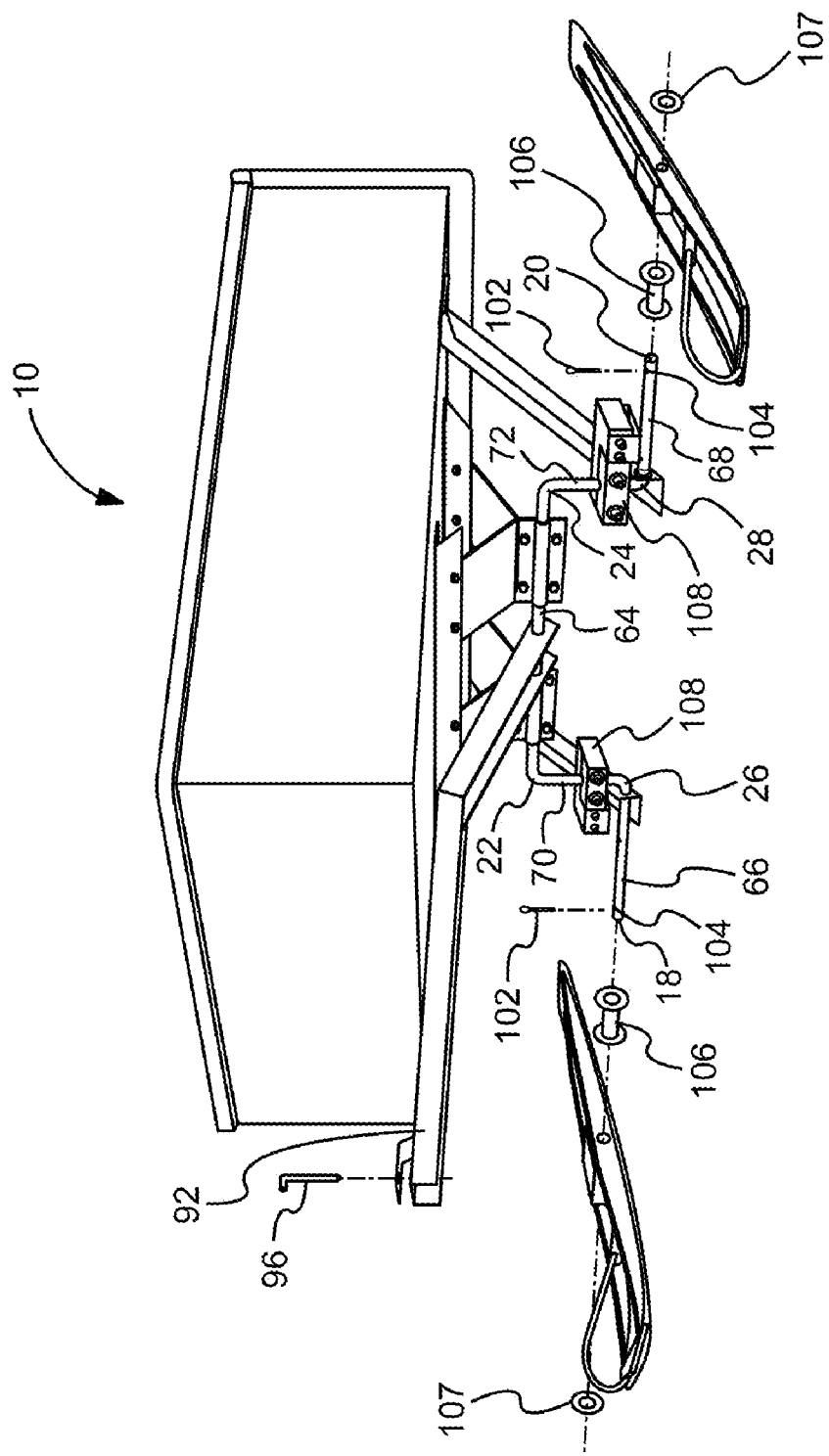
FIG. 8 depicts an exploded view of the cargo cart of FIGS. 1-7 in the ski embodiment.

FIG. 8 shows an exploded view of the cargo cart 10 in the sled embodiment. Particularly, FIG. 8 shows how the skis 36 attach to the axle 16. To attach and secure the skis 36, the openings 80 of the shafts 74, 76 are first inserted into the ends 18, 20 of the axle 16 similar to the attachment of the wheels 34, described hereinabove. Next a bushing 106 is inserted over each of the ends 18, 20 of the axle 16. The bushings 106 may be configured to space the skis 36 away from the third and fourth bends 26, 28. The bushings 106 may have a lesser length than the wheel bushing spacers 100. Once the bushings 106 have been inserted over each of the ends 18, 20 of the axle 16, the skis 36 may be inserted. A second bushing or washer 107 may next be inserted over each of the ends 18, 20. Finally, the pin 102 may be inserted through the hole 104 in the axle 16 to secure the skis 36.

Figure 9:
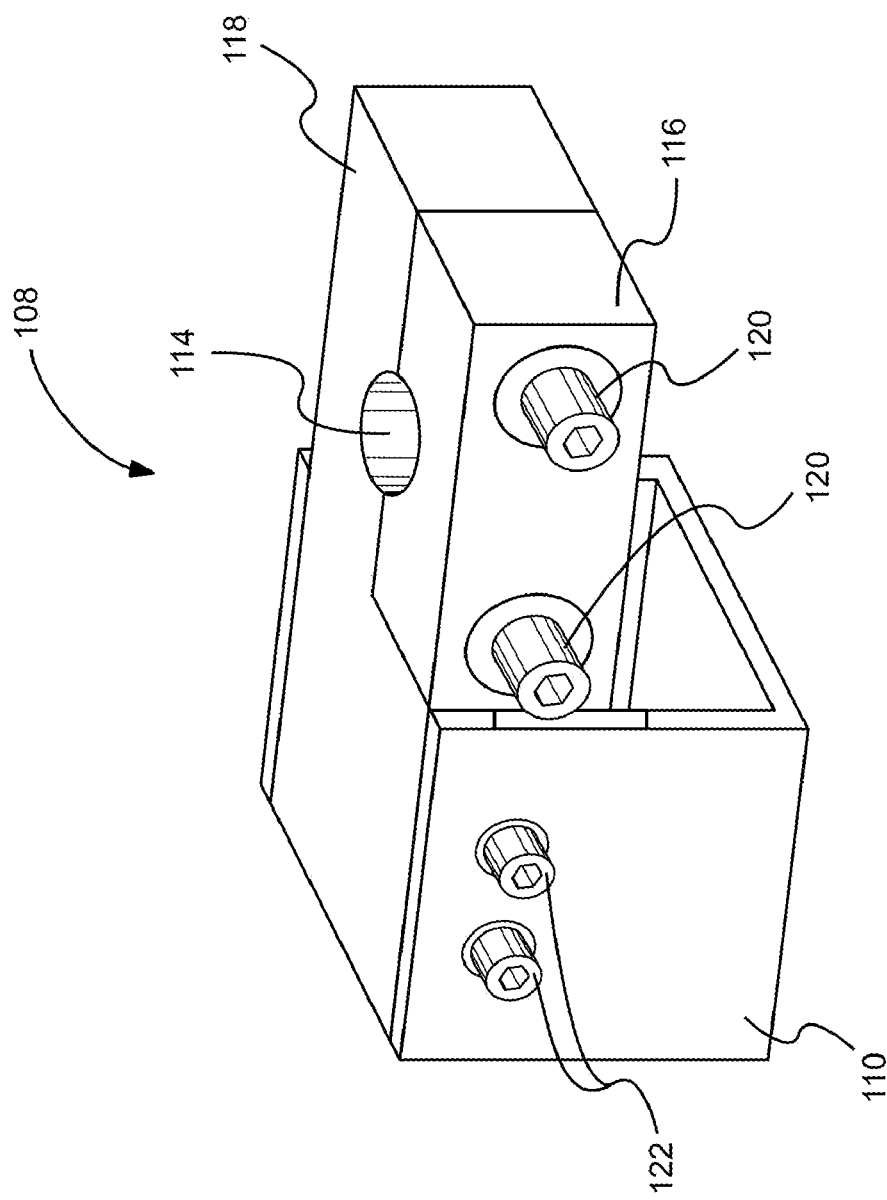
FIG. 9 depicts a perspective view of a stabilizer block in accordance with one embodiment.

Once the skis 36 have been inserted and secured on the axle 16, the skis 36 may be undesirably free to rotate about the axle 16. To prevent this, a stabilizing element or elements may be utilized. Shown in the Figures and more particularly in FIG. 9 is a stabilizer block 108 and stabilizer extension piece 110 that are utilized in combination with a foam block 112 (shown in FIG. 11) to prevent rotation of the skis 36. The stabilizer block 108 may be attachable to the fourth and fifth sections 70, 72 of the axle 16. The stabilizer extension piece 110 may be a U-shaped piece. The two sides of the U-shape of the stabilizer piece 110 each extend from the stabilizer block 108 to the axle 16 such that the bottom of the U-shape is adjacent to the axle 16. Each of the sides of the U-shape of the stabilizer piece 110 extends to opposite sides of the axle 16. The foam block 112 may have a bore 114 there through and may be located between opposing walls 116 of the skis 36. The block 112 may be inserted over the axle 16 during the installation and securing of the skis 36 to the axle 16. The bottom of the U-shaped extension piece 110 may abut the foam block 112 to prevent significant rotation of the skis 36. Of course, the stabilizer block 108, stabilizer extension piece 110 and the foam block 112 may not prevent all rotation of the skis 36, but may allow minor rotation of the skis 36.

The stabilizer block 108 may include a corner piece 116 that is detachable and attachable to a main portion 118 of the stabilizer block 108. This allows for the stabilizer block 108 to be removed during the wheeled embodiment and attached during the sled embodiment of the cargo cart 10. Detachment of the corner piece 116 allows for the attachment of the stabilizer block 108 to the axle 16. Bolts 120 may be utilized to attach and detach the corner piece 116 with the main portion 118. Likewise, bolts 122 may be utilized to secure the stabilizer extension piece 110 to the stabilizer block 108. The bolts 122 may be the same or different from the bolts 120. Furthermore, other attachment elements may be utilized instead of the bolts 120 and the bolts 122. For example, screws, fasteners, welds, nuts, or the like may be used. Any attachment mechanisms are contemplated.

Moreover, the stabilizer block 108, stabilizer extension piece 110, and foam block 112 are shown to stabilize the ski 36. However, other stabilization means are contemplated. For example, a single stabilizer element may be attachable to the axle 16, rather than the stabilizer block 108 and the stabilizer extension piece 110 combination. Alternately, a stabilizer may be integrally included in the axle 16. Any stabilizing means is contemplated that prevents undesirable substantial rotation of the skis 36 about the axle 16.

FIG. 10 shows the wheel 34 in an unattached storage configuration. The wheels 34 may be stored in this condition when the cargo cart 10 is in the sled embodiment and does not require the wheels 34 or the bushing 100. In this embodiment, two hollow rods 124 may be provided that are each inserted into the respective hubs of the unused wheels 34. The hollow rod 124 may include holes at each end for the insertion of pins to retain the wheel 34 and bushing 100 together. The hollow rod 124 may thus be used to prevent a person from losing the bushing 100 or pins when the wheel 34 is not in use.

Figure 11:
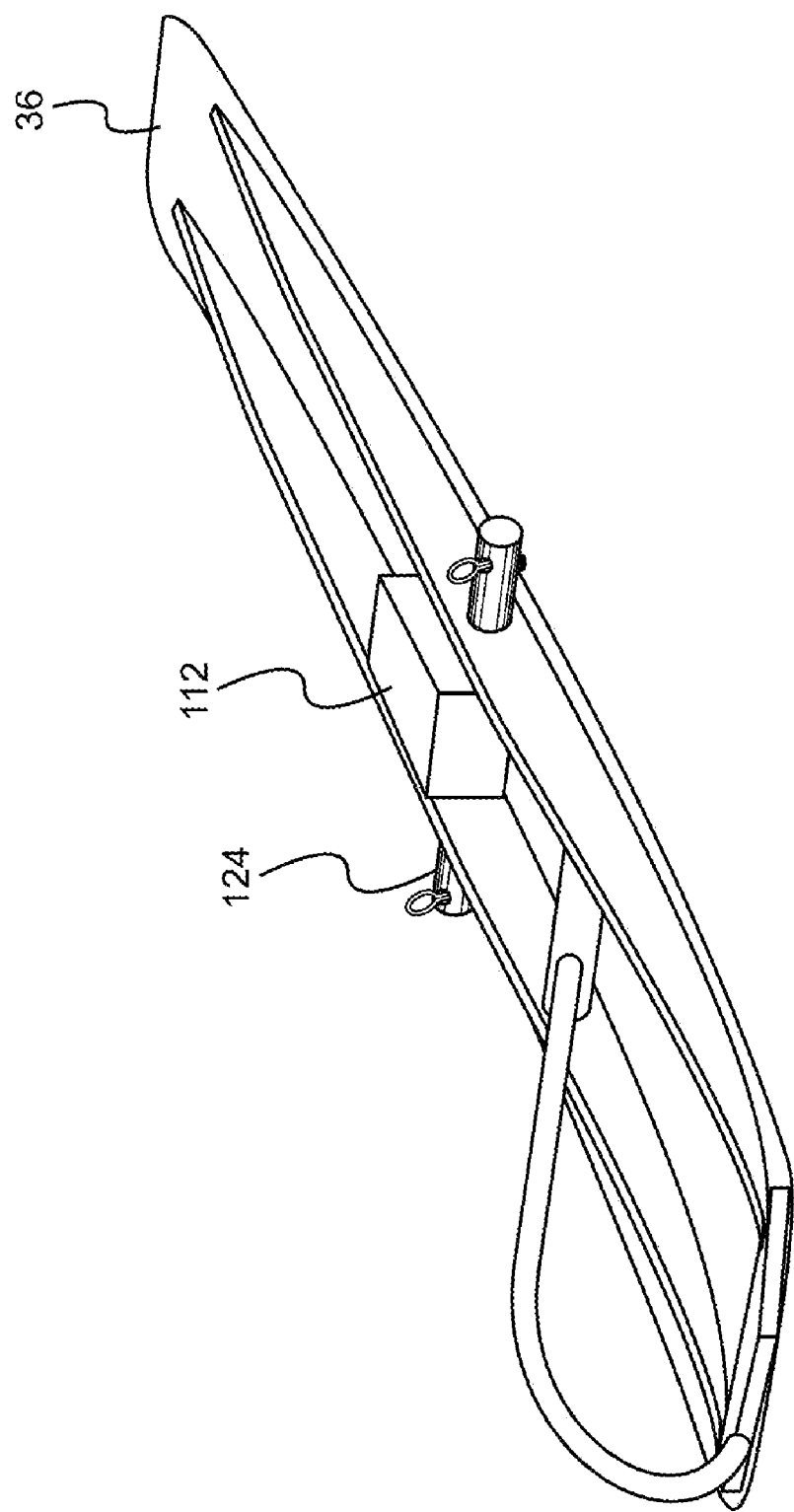
FIG. 11 depicts an unattached ski in a storage configuration in accordance with one embodiment.

Referring to FIG. 11, the ski 36 is shown in an unattached storage configuration. The skis 36 may be stored in this condition when the cargo cart 10 is in the wheeled embodiment and does not require the skis 36 or the bushings 106. In this embodiment, the same two hollow rods 124, described hereinabove, may be provided that are each inserted into the respective openings of the unused skis 36. The hollow rod 124 may thus also be used to prevent a person from losing the bushings 106 or pins when the ski 36 is not in use.

In a further embodiment, a kit may be provided that includes any or all of the elements described herein. The elements may be configured to convert a typical cargo cart into a cargo cart that is convertible between a wheeled embodiment and a sled embodiment, such as the cargo cart 10. To accomplish this, the kit may include two wheels and two skis, such as the wheels 34 and the skis 36. Alternately, the kit may include only the skis, if the typical cargo cart includes acceptable wheels. The kit may include a bracket, such as the bracket 46, configured to attach to the under surface of the cargo cart. The kit may include a bent axle, such as the axle 16. The kit may also include a tongue, such as the tongue 92. The kit may also include shafts, such as the shafts 74, 76. Furthermore, the kit may include a stabilizer element or elements, such as the stabilizer block 108, stabilizer extension piece 110, and foam block 112. Still further, the kit may include pins, such as the pins 102 and bushings, such as the bushings 100, 106. The kit may yet further include two hollow rods, such as the rods 124 for storing the wheels when the cart is in the sled embodiment and for storing the skis when the cargo cart is in the wheeled embodiment. Finally, the kit may include a number of bolts or any other appropriate attachment mechanisms, such as the bolts 58, 62, 86, 96, 120, 122.

Moreover, a method of using a cargo cart, such as the cart 10 is disclosed herein. The method of using the cargo cart may comprise removing a wheel, such as the wheel 34, from an end of an axle, such as the axle 16 of the cargo cart, wherein the axle is in a first position. The method may further comprise rotating the axle of the cargo cart into a second position. The end of the axle is located further from an under surface, such as the under surface 14, of a bed, such as the bed 12, of the cargo cart in the second position than in the first position. The method may further include inserting a ski, such as the ski 36, onto the end of the axle of the cargo cart when the axle is in the second position. Still further, the method may include securing the ski to the axle of the cargo cart after the ski is inserted. Securing the ski to the axle may further include inserting a pin into a hole of the axle.

Moreover, the method may include removing a shaft, such as one of the shafts 74, 76 from a first location of the under surface of the bed, wherein the shaft is connected to the axle. The method may further comprise securing the shaft to a second location of the under surface of the bed when the axle is in the second position, wherein the second location is located further from a back side of the bed than the first location. The method may further comprise attaching a tongue of the garden cart, such as the tongue 92, to a vehicle.

Figure 12:
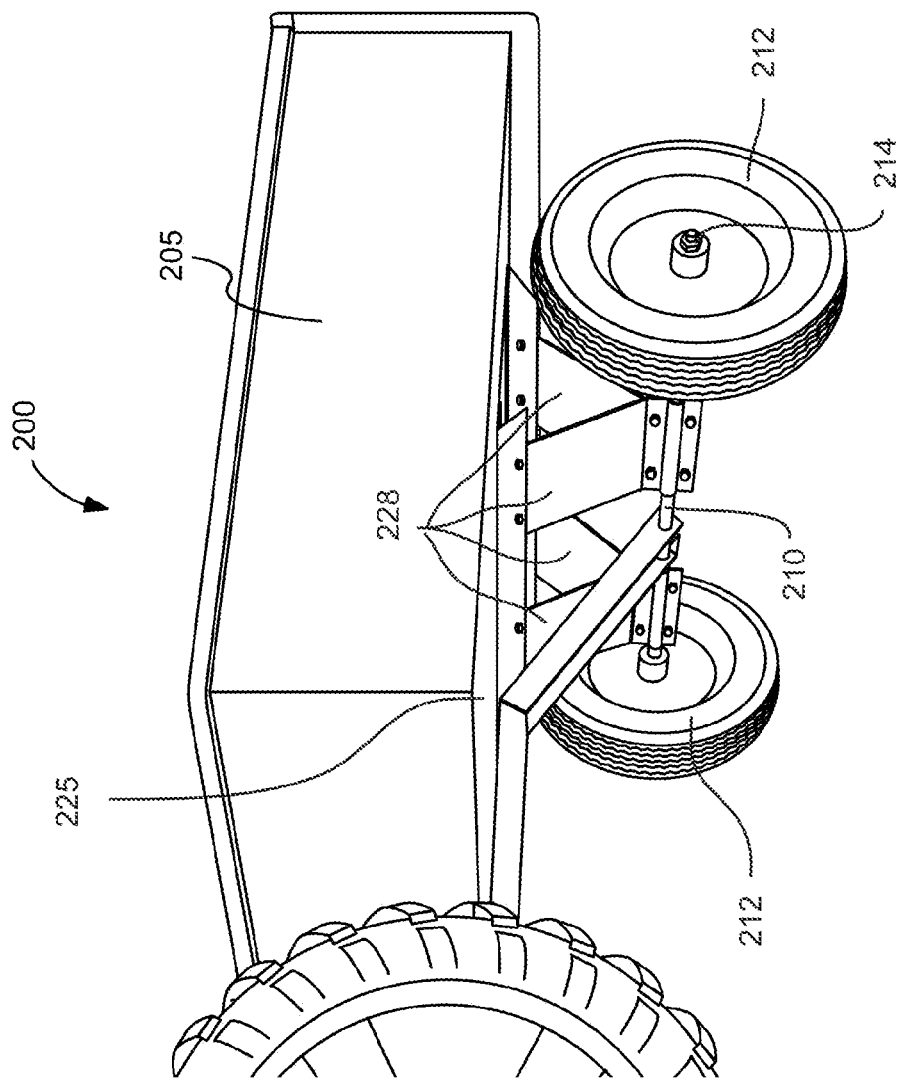
FIG. 12 depicts a perspective view of a cargo cart having an axle with attached wheels in accordance with another embodiment.
Figure 13:
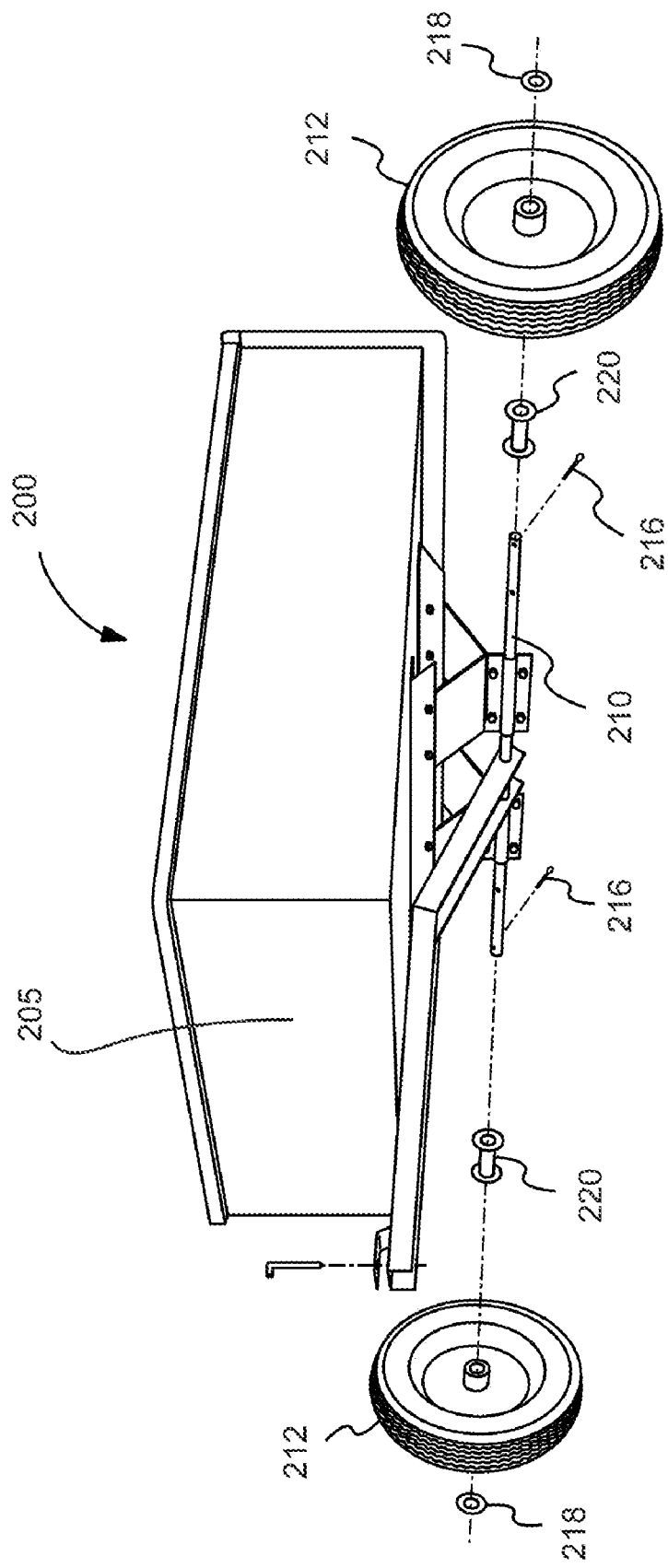
FIG. 13 depicts an exploded view of the cargo cart of FIG. 12 in accordance with one embodiment.

Referring now to FIGS. 12-13, another embodiment of a cargo cart 200 is shown. Many features of the cargo cart 200 are similar to the cargo cart 10 described hereinabove. However, the cargo cart 200 includes a straight axle 210 under a bed 205. Wheels 212 are attached to the straight axle 210 with attachment mechanisms such as a nut 214 (shown in FIG. 12). The ends of the straight axle 210 may be threaded to receive the nut 214. However, the ends of the straight axle 210 may instead include a hole (shown in FIG. 13) to receive a pin attachment mechanism 216 and washer 218. It should be understood that any attachment mechanism 214, 216 is contemplated that would allow for the wheels 212 to be removed from the axle 210. As shown in FIG. 13, spacers 220 may be utilized in order to properly space the wheel 212 into position at the end of the axle 210 for operation of the cargo cart 200.

Figure 14:
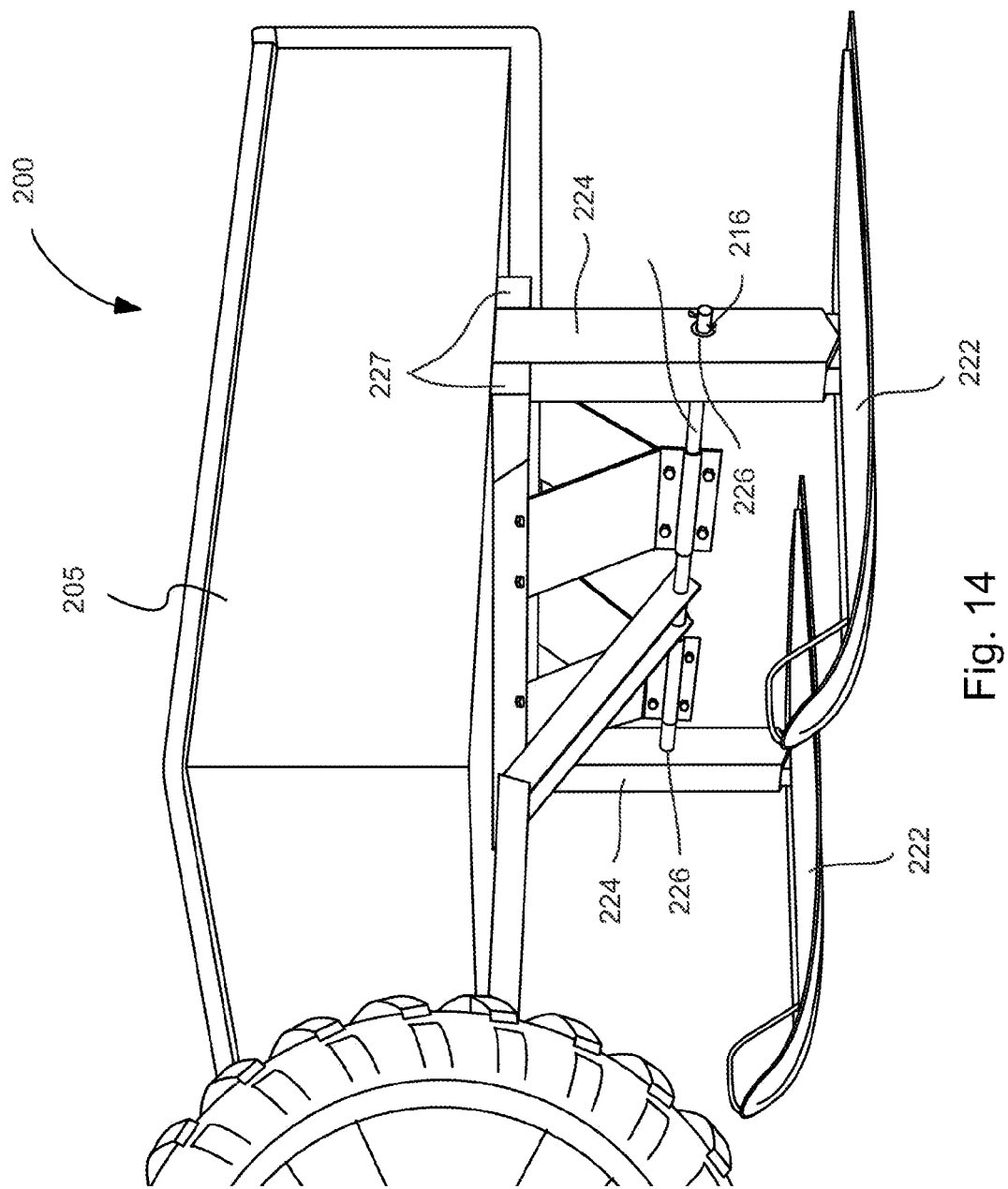
FIG. 14 depicts a perspective view of the cargo cart of FIG. 12-13 having the axle with attached skis in accordance with one embodiment
Figure 15:
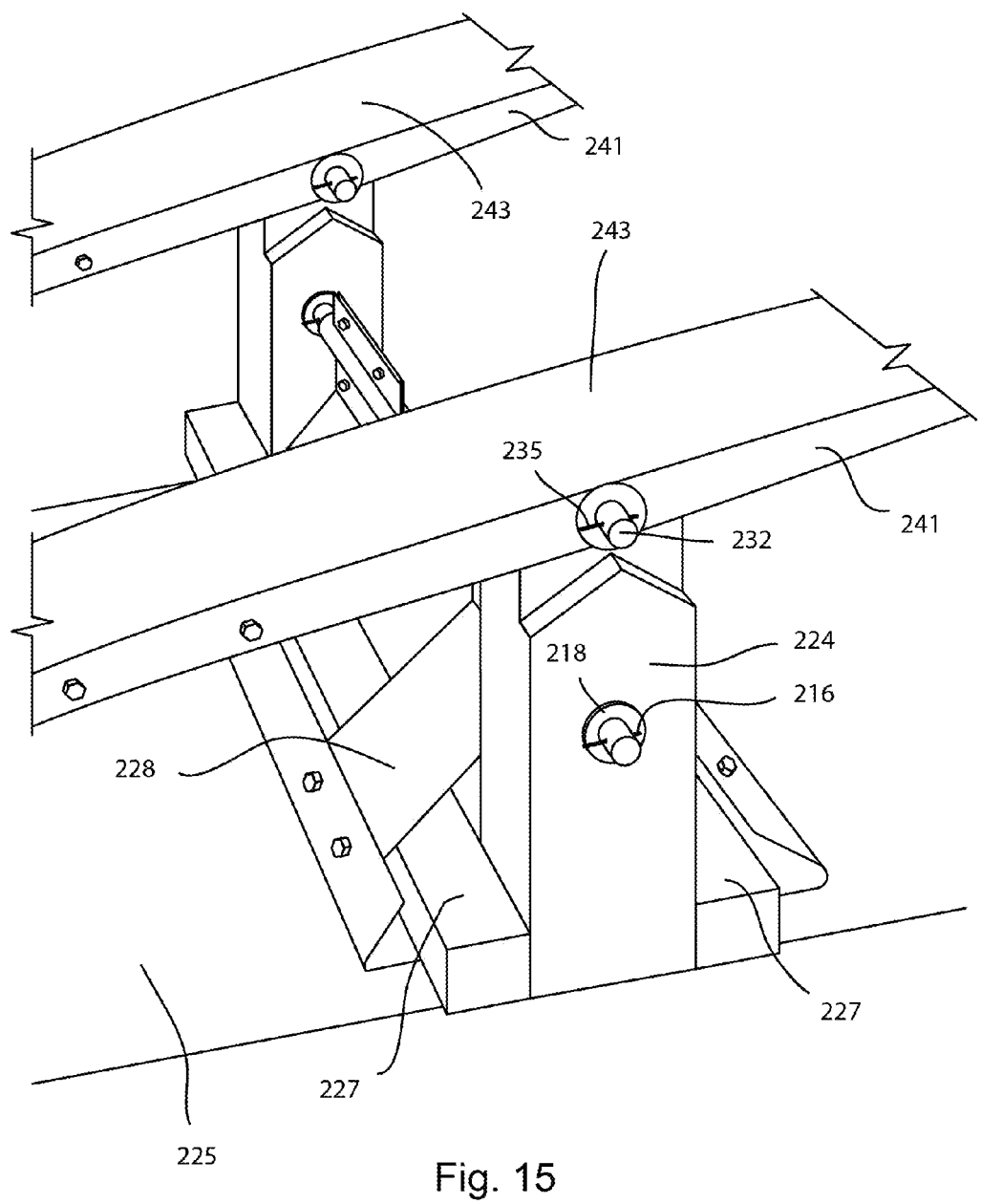
FIG. 15 depicts a perspective view of the underside of the cargo cart of FIGS. 12-14 in accordance with one embodiment.
Figure 16:
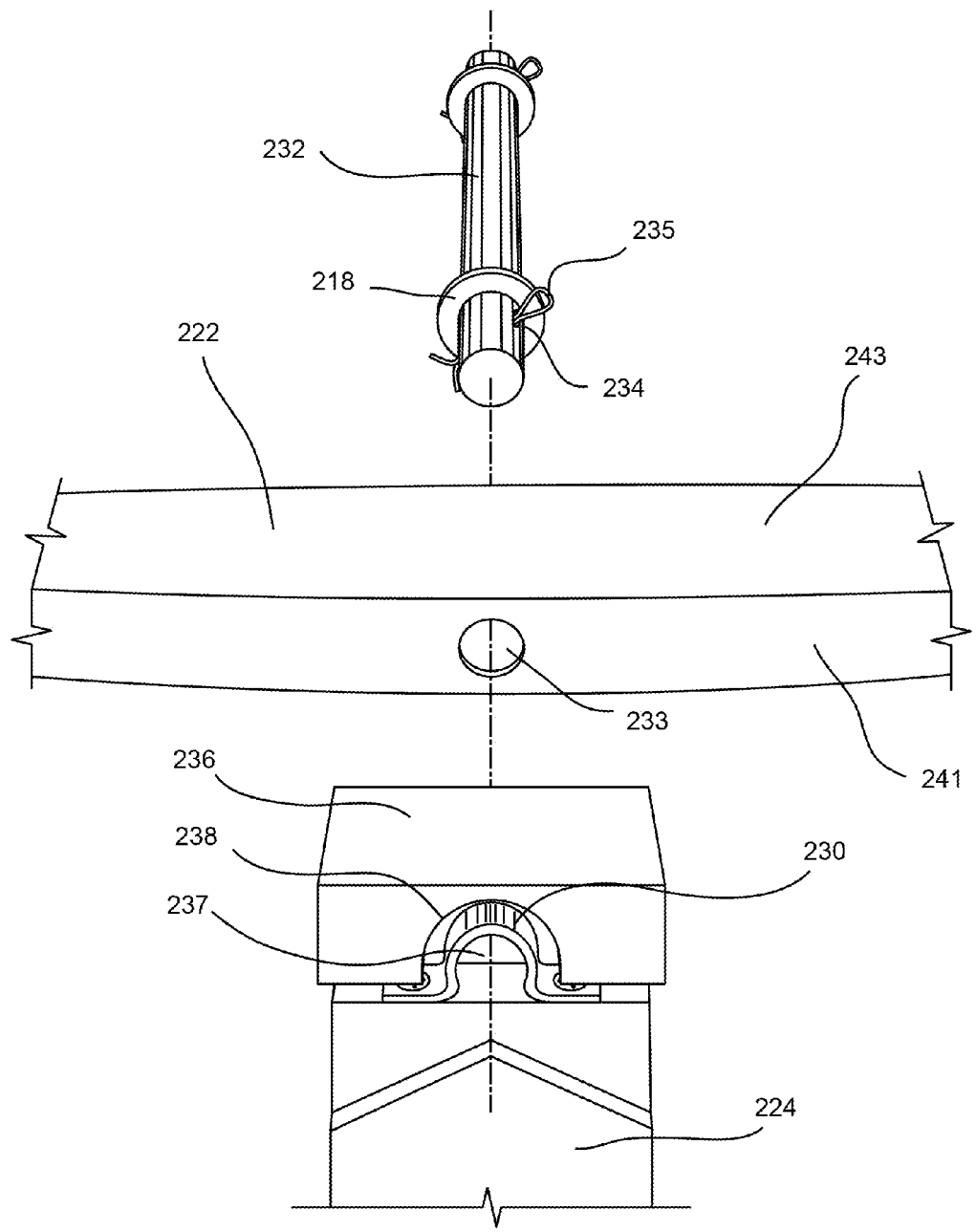
FIG. 16 depicts an upside down perspective view of an assembly connecting an extender leg to the ski in accordance with one embodiment.

Referring now to FIG. 14, another perspective view is shown of the cargo cart 200, this time with two skis 222 attached. FIGS. 15-16 show other views of this embodiment. In this embodiment, two extender legs 224 are slid onto the axle 210 through upper openings 226. The extender legs 224 extend all the way from the axle 210 to the underside 225 of the bed 205. Further, the extender legs 224 extend below the axle 210 so that the attached skis 222 are located at a lower level than the straight axle 210. This may accommodate the raising of the bed 205 of the cargo cart 200 to a similar level as would be achieved by the rotation of the bent axle 16 described hereinabove with respect to the cargo cart 10.

The underside of the cargo cart 200 may further include supporting bars 227 running from the left side of the cargo cart 10 to the right between pairs of plates 228. It should be understood that the pairs of plates 228 may be similar to the pairs of plates 54, 56 described herein above. The supporting bars 227 run along the underside of the bed 205 and may support the extending legs 224 on each side and prevent the extending legs 224 from rotating about the axle 210. Thus, when the extending legs 224 are slid onto the axle 210, the legs 224 are also slid between the supporting bars 227 to prevent movement.

It is further contemplated that a V-shaped foam portion (not shown) may also be provided within the plates 228 in order to ensure that the supporting bars 227 remain in position proximate the underside of the bed 205. The foam portion may comprise a substantial amount of the total volume of space between the plates 228. Two foam portions may be provided, one within each V-shaped section between the plates 228. Alternately, a single foam portion extending between both of the pairs of plates 228 may be provided. The foam blocks may be attached between the pairs of plates 228 with any type of attachment mechanism such as a clamp, clasp, adhesive, button, hook and loop, or the like. Furthermore, the foam portions may not be foam at all, but may instead be any other appropriate material that may provide support for the structure described herein.

The extending legs 224 are shown comprising the rough dimensions of a 4×4 wood block. The extending legs 224 may, however, be made of wood, metal, plastic, a composite or any appropriate material. The end of the extending legs 224 located at the ski may be shaved on both sides in order to accommodate the dimensions of the ski 222. This may be desirable if a wider leg is needed to ensure the robustness of the attachment. However, depending on the material properties of the leg 224, it should be understood that legs 124 having smaller cross sectional dimensions may be desirable.

Shown in FIG. 14 is a view of the bottom of the cargo cart 200 after attaching the legs 224 with the skis 222. Further, FIG. 15 shows an assembly view of the ski 222 prior to being attached to the leg 224. The assembly view is shown "upside down" to depict an embodiment where a user is installing the skis after turning the cargo cart 200 over onto its bed 205 for ease of attachment. The ends of the legs 224 may include U-clamps 230 bolted into the bottom end. These U-clamps 230 may be used to support a rod 232 that may be extended through in order to secure the end of the legs 224 to the ski 222. The ski 222 may include openings 233 in order to accept the rod 232. The openings 233 of the ski 222 may be located within side walls 241 of the ski that may extend perpendicularly upward from a bottom surface 243 of the ski 222. The rod 232 may further include holes 234 on each side within which to insert a pin 235 for securing the rod 232 within position, thereby securing the legs 224 to the ski 222. Still further, the legs 224 may include lower openings 237 within which to accept the rod 232.

A foam block 236 having a U-shaped cutout 238 for accommodating the U-clamps 230 and the rod 232 may help support the assembly, and allow for minor rotation of the ski 222 about the pin 230 with respect to the legs 224. Thus, the foam block 236 may act as a spring to allow for some give during operation of the cargo cart 200. While foam is contemplated, the cutout block 236 may comprise any appropriate material that would serve to prevent the ski 222 from rotating about the rod 232 with respect to the legs 224. Furthermore, other embodiments are contemplated by which the extending legs 224 may be attached to the ski 222.

In order to replace the wheels 212 of the cargo cart 200 with the skis 222, an operator may first remove the attachment mechanism such as the pin or nut 214. Once removed, the wheels 212 may slide from the ends of the straight axle 210. Once the axle 210 is free, the extending legs 224 may be inserted onto the axle 210. The axle 210 may be inserted through the upper openings 226. The axle 210 may then be secured to the extending legs 224 by the reapplication of the attachment mechanism such as the pin or nut 214. The rods 232 may be inserted through the plates 228.

Once the legs 224 are securely attached to the axle 210, the skis 222 may be attached to the legs 224. Alternatively, the skis 222 may remain attached to the legs 224 during and after removal of the legs 224 from the axle 210. The entire ski and leg combination 222, 224 may be slid back onto the axle 210 during reassembly. Additionally, in another embodiment, the skis and the legs 222, 224 may be integrated into a single combination piece or element (not shown). To attach the skis 222 to the legs 224, the foam block 236 may be positioned within the ski 222 such that the blocks 236 are aligned with the openings 233 of the ski 222. Next, the ski 222 may be placed in proximity with the legs 224 such that the U-clamps 230 are placed within the U-cutouts 238. Thus, all of the openings 233, 237, 238 may be aligned to accept the rod 232. The rod 232 may be inserted through these elements and then bound by the pins 235. Once attached, however, the skis 222 may be located at approximately the same level with respect to the bed 205 as the bottom of the wheels 212 to keep the bed 205 at an equivalent distance above the ground during operation of both the ski and wheeled embodiments.

Figure 17:
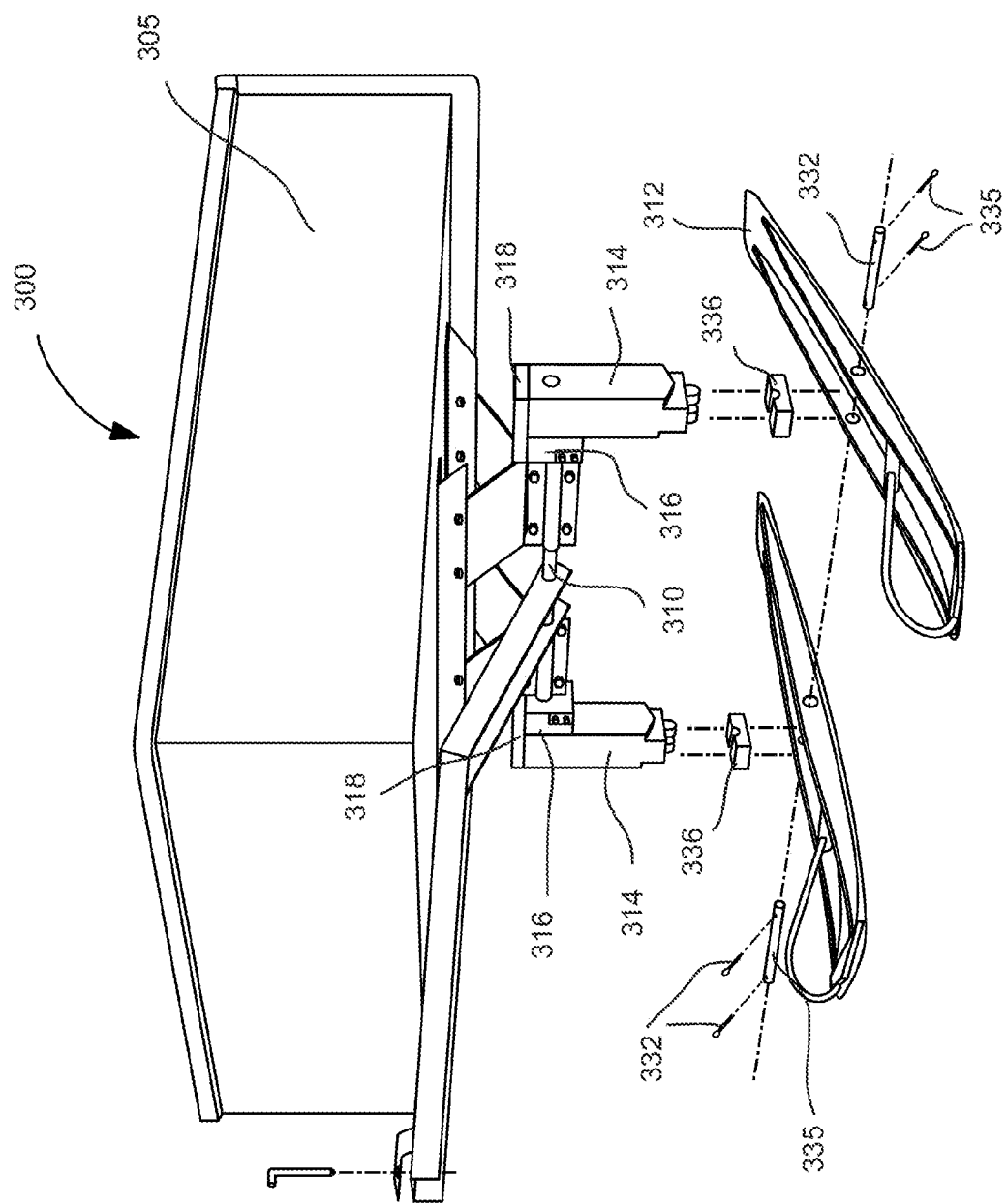
FIG. 17 depicts a perspective view of another cargo cart with another ski attachment in accordance with one embodiment.
Figure 18:
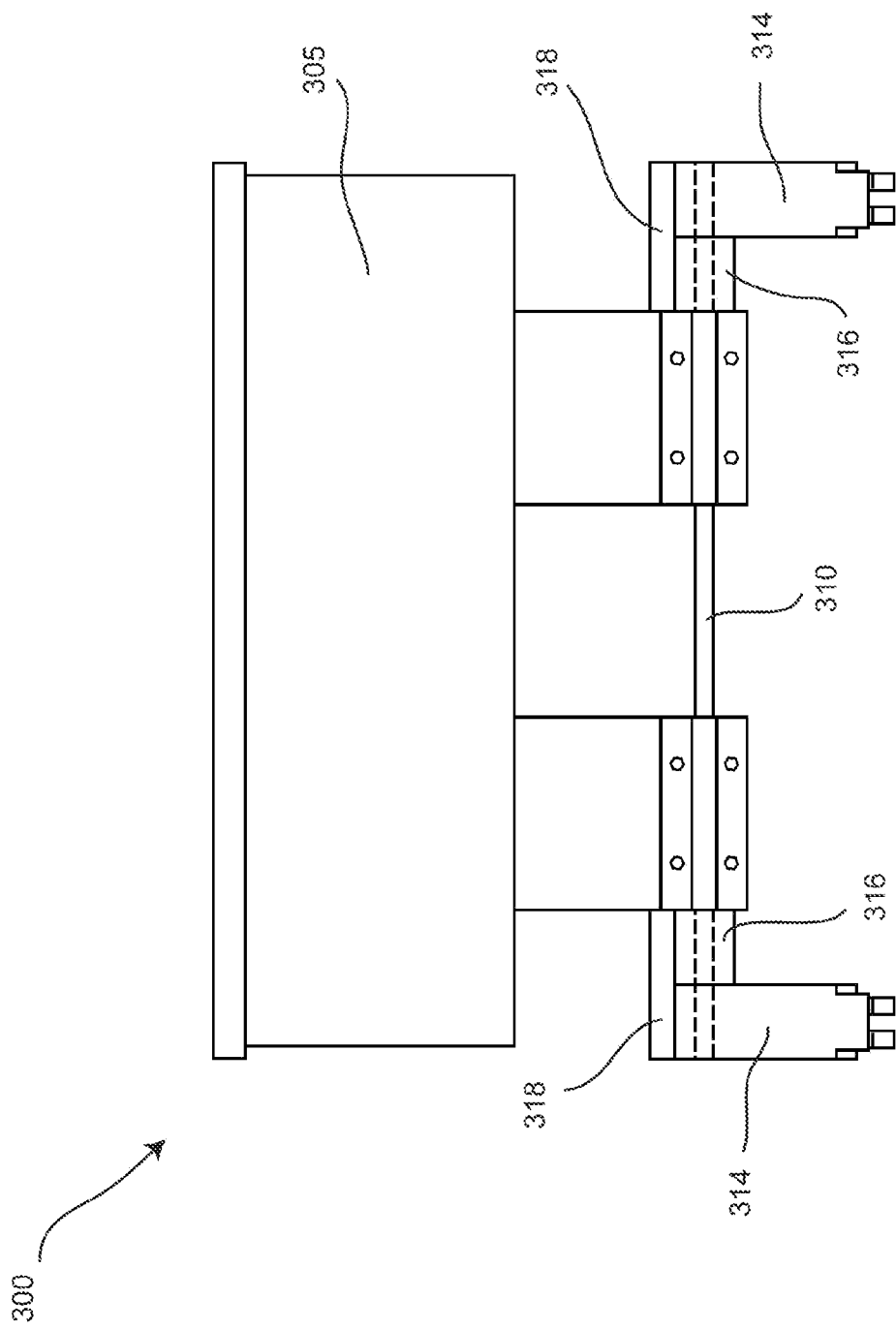
FIG. 18 depicts a front view of the cargo cart of FIG. 17 prior to attachment of skis in accordance with on embodiment.

Referring now to FIGS. 17-18, another embodiment of a cargo cart 300 is shown with a bed 305 and a straight axle 310 and attached skis 312. FIG. 18 shows a front view of the cargo cart 300 prior to the attachment of the skis 312. The cargo cart 300 may be very similar to the cargo cart 200 described herein above. Thus, the cargo cart 300 may include rods 332, like the rods 232, and pins 335 like the pins 235, and foam blocks 336 like the foam blocks 236. It should be understood that the cargo cart 300 may include wheels, such as the wheels 212 for replacement with the skis 312. The skis 312 are removable in a similar manner to the manner described herein above with respect to the cargo cart 200. However, in this embodiment, an extender leg 314 does not extend from the axle 310 to the bed 305. Rather, the extender leg 314 only extends from just above the axle 310 to the ski 314. In order to retain the extender leg 314 in position without rotating about the axle 310, a stabilizer block 316 may be attached to the axle. The stabilizer block 316 may be similar to the stabilizer block 108 shown in FIG. 9. However, unlike the stabilizer block 108, the stabilizer block 316 may not need an extender piece 110. Instead, the stabilizer block 316 may be a rectangular cube in shape with an opening in the middle and removable from the axle by unattaching bolts similar to the stabilizer block 108 shown in FIG. 9.

When the stabilizer block 316 has been attached to the axle 310 in the embodiment depicted, the stabilizer block 316 may grip the axle 310 so tightly that it does not rotate about the axle 310. Once this is achieved, the leg 314 may be slid onto the axle 310. The extender leg 316 may be similar to the extender leg 224. However, in this embodiment, a plate 318 may be attached to the extender leg 316. Alternately, the plate 318 may be integral to the extender leg 316, rather than comprise a separate component. The plate 318 may be slid over the stabilizer block 316 to prevent the extender leg 316 from rotating about the axle 310. It should be understood that the connection between the extender leg 316 and the skis 312 may be similar to the embodiment described hereinabove with respect to the extender legs 224 and the skis 222. The plate 318 and the leg 316 may be made of any appropriate material such as wood, plastic, composites, or metal.

Figure 19:
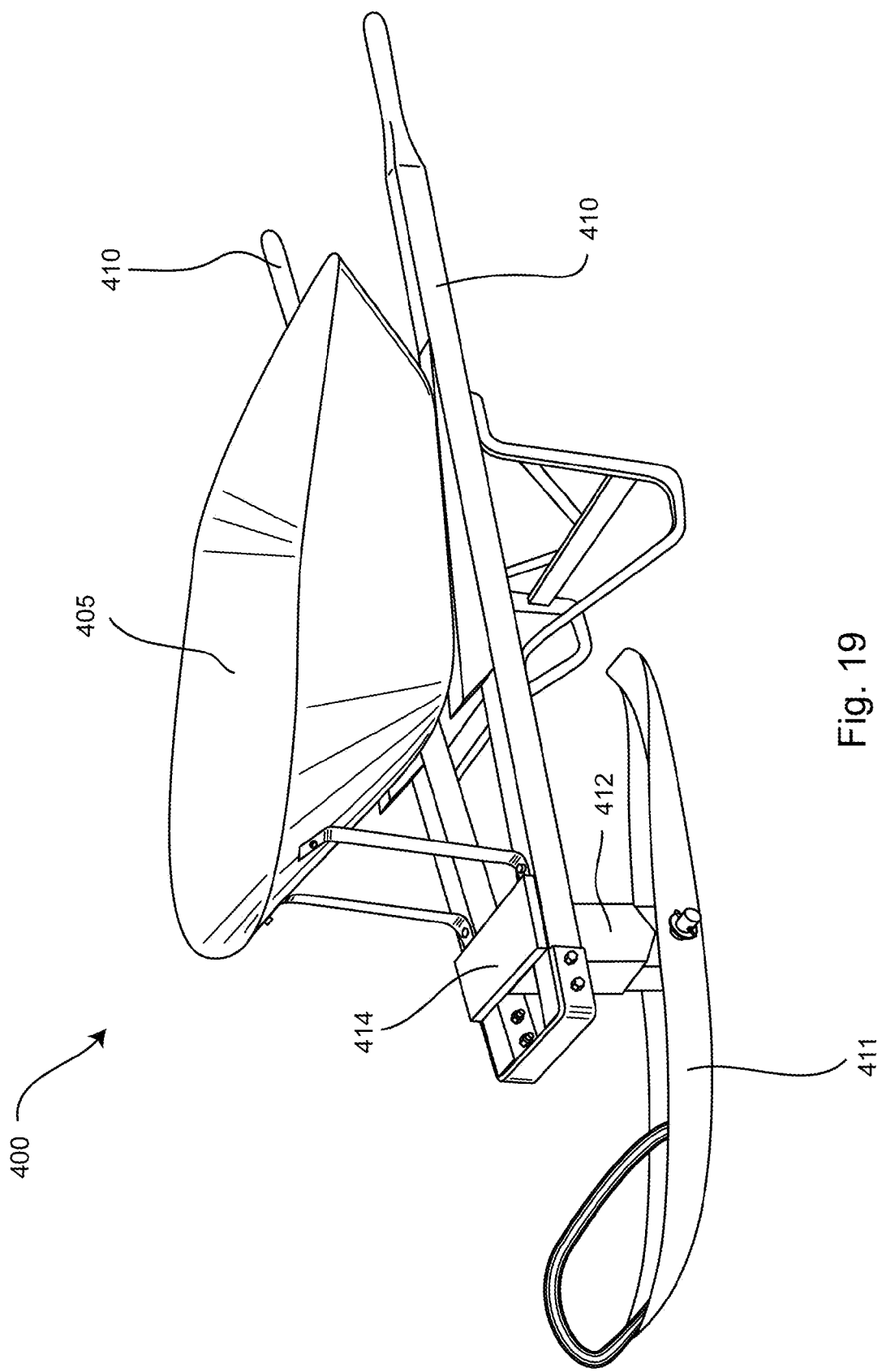
FIG. 19 depicts a perspective view of another embodiment of yet another cargo cart with a ski attachment in accordance with one embodiment.
Figure 20:
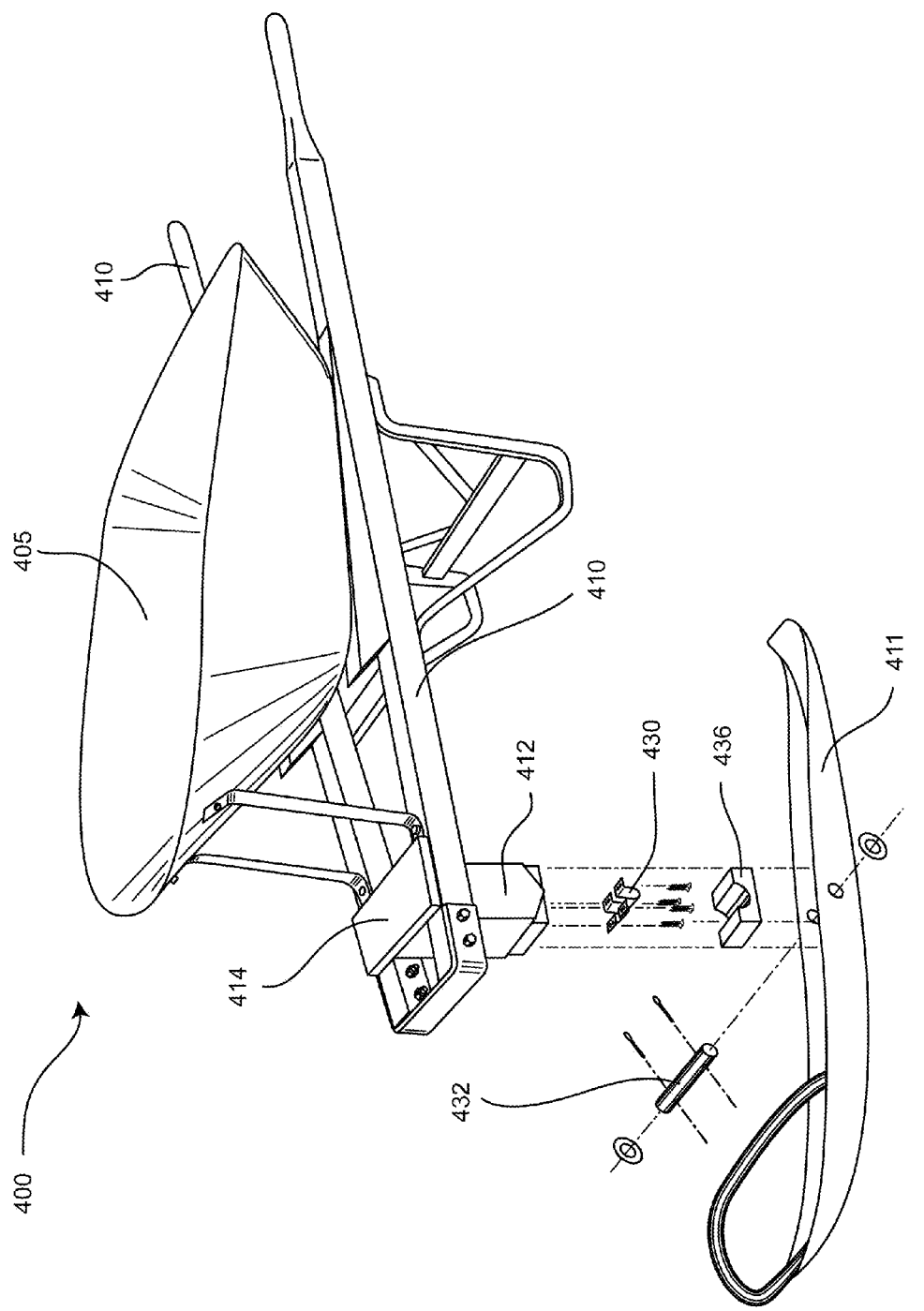
FIG. 20 depicts an exploded view of the cargo cart of FIG. 19 in accordance with one embodiment.

Referring now to FIGS. 19-20, another embodiment of a cargo cart 400 is shown with a ski 411 instead of a wheel. The cargo cart 400 may include a foam block 436, similar to the foam blocks 236, 336, and a rod 432 similar to the rods 232, 332, and a U-clamp 430 similar to the U-clamp 230. In this embodiment, the cargo cart 400 includes a bed 405 and other components of a wheel barrel. However, this embodiment depicts that the wheel barrel includes a removable wheel and an attachable ski 411. In this embodiment, the axle and wheel (not shown) of the wheel barrel 400 may be removed from between two handle beams 410. One extender leg 412, similar to the legs 224, 316, may then be positioned between the handle beams 410. A plate 414, similar to the plate 318, may be attached to the two handle beams 410. The plate 414 may extend on both sides of the extender leg 412 over the handle beams 410. The plate 414 may be bolted into the handles, nailed, or otherwise attached in a manner to secure the extender leg 412 to the wheel barrel 400. The extender leg 412 may be attached to the ski 411 in a similar manner to that described hereinabove with respect to the garden carts 300, 400. It should be understood that the Figures only depict a single embodiment that is not limiting. The ski 411 may be shorter and wider in other embodiments. The ski 411 may also be moved forward or backward with respect to the bed 405 of the cart 400, compared to the embodiment shown in the Figures, in order to allow for an ease of tipping or dumping.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the invention have been described, it is to be understood that aspects of the disclosure may include only some of the described embodiments. Accordingly, the disclosure is not to be seen as limited by the foregoing description, but is only limited by the scope of the appended claims.

What is claimed is:

1. A cargo cart comprising:
    a bed configured for carrying cargo, the bed an upper surface and an under surface;
    an axle located beneath the under surface of the bed, the axle having a first end and second end;
    a first leg removably attached to the first end of the axle such that the first leg is prevented from substantial rotation about the axle, the first leg extending below the axle to a first connection location;
    a first ski removably connected to the first leg at the first connection location;
    a second leg removably attached to the second end of the axle such that the first leg is prevented from substantial rotation about the axle, the second leg extending below the axle to second connection location; and
    a second ski removably connected to the second leg at the second connection location;
    wherein the first and second legs each include a first opening through which the axle may be inserted to connect the first and second legs to the axle.

2. The cargo cart of claim 1, wherein the first and second legs and the first and second skis are removable for the attachment of wheels to the axle.

3. The cargo cart of claim 1, wherein the first and second legs each include a U-clamp through which a rod may be inserted to connect the first and second legs to the first and second skis.

4. The cargo cart of claim 3, wherein the first and second skis each include a pair of openings through which the rod may be inserted to connect the first and second legs to the first and second skis.

5. The cargo cart of claim 4, wherein a foam block is located between the end of each of the first and second legs and the first and second skis to act as a spring.

6. The cargo cart of claim 1, wherein the first and second legs each extend from the axle to the under surface of the bed.

7. The cargo cart of claim 6, wherein first and second legs are supported at the undersurface of the bed within a channel to prevent rotation of the first and second legs about the axle.

8. The cargo cart of claim 1, wherein a plate is attached to each of the first and second legs, wherein the plate is configured to prevent the legs from rotating about the axle.

9. A kit for a cargo cart comprising:
    a first leg having a first opening, the first opening configured to receive a first end of an axle of the cargo cart such that the first leg is configured to extend below the axle to a first connection location;
    a first ski removably connectable to the first leg at the first connection location;
    a second leg having a second opening, the second opening configured to receive a second end of the axle of the cargo cart such that the second leg is configured to extend below the axle to a second connection location;
    a second ski removably connectable to the second leg at the second connection location; and
    a means for preventing substantial rotation of the first and second legs about the axle when the first and second legs are attached to the axle.

10. The kit for a cargo cart of claim 9, further comprising:
    a bed configured to carry cargo;
    the axle attachable below the bed;
    a first wheel removably attachable to the axle; and
    a second wheel removably attachable to the axle.

11. The kit for a cargo cart of claim 9, further comprising a first rod and a second rod for attaching the first ski to the first leg and the second ski to the second leg.

12. The kit for a cargo cart of claim 11, wherein the first and second connection locations each include a U-clamp through which the first and second rods are insertable.

13. The kit for a cargo cart of claim 12, further comprising a first and second foam block, each with a U-shaped cutout, wherein first foam block is attachable between the first ski and the first leg, and wherein the second foam block is attachable between the second ski and the second leg.

14. The kit for a cargo cart of claim 13, wherein the first and second skis each include a pair of openings through which at least one of the first and second rods may be inserted to connect the first and second legs to the first and second skis.

15. The kit for a cargo cart of claim 9, wherein the means for preventing substantial rotation of the first and second legs about the axle when the first and second legs are attached to the axle includes an attachable channel under the bed of the cargo cart for insertion of an end of the first leg and insertion of an end of the second leg.

16. A cargo cart comprising:
  a bed configured for carrying cargo, the bed including a left side, a right side, a front side and a back side, the bed further including an upper surface and an under surface;
  a first handle beam extending along the left side of the cargo cart;
  a second handle beam extending along the right side of the cargo cart, wherein the first and second handle beams converge at the front side of the bed;
  a leg having a top end removably attached between the first and second handle beams at the front side of the bed, the first leg extending below the first and second handle beams to a first connection location at a bottom end; and
  a ski removably connected to the first leg at the first connection location.

17. The cargo cart of claim 16, wherein the cargo cart is a modified wheel barrel and wherein the cargo cart is configured to receive a wheel between the first and second handles.

18. The cargo cart of claim 16, further comprising a plate attached to the leg at the top end, the plate extending over the first handle beam and the second handle beam, the plate attached to the first handle beam and the second handle beam.

19. The cargo cart of claim 18, further comprising an attachment rod, wherein leg includes a U-clamp at the bottom end for attaching the leg to the ski with the attachment rod.

* * * * *